(12) United States Patent
Kalenian

(10) Patent No.: US 11,864,683 B2
(45) Date of Patent: Jan. 9, 2024

(54) METHODS FOR PRODUCING LIQUID EXTRACTS

(71) Applicant: Kalenian Coffee Consulting LLC, Santa Fe, NM (US)

(72) Inventor: Paul A. Kalenian, Santa Fe, NM (US)

(73) Assignee: Kalenian Coffee Consulting LLC, Santa Fe, NM (US)

( * ) Notice: Subject to any disclaimer, the term of this patent is extended or adjusted under 35 U.S.C. 154(b) by 177 days.

(21) Appl. No.: 17/355,868

(22) Filed: Jun. 23, 2021

(65) Prior Publication Data

US 2021/0401218 A1 Dec. 30, 2021

Related U.S. Application Data

(60) Provisional application No. 63/043,242, filed on Jun. 24, 2020.

(51) Int. Cl.
*A47J 31/00* (2006.01)
*A47J 31/06* (2006.01)

(52) U.S. Cl.
CPC ........... *A47J 31/002* (2013.01); *A47J 31/007* (2013.01); *A47J 31/0663* (2013.01)

(58) Field of Classification Search
CPC ..... A47J 31/002; A47J 31/007; A47J 31/0663
See application file for complete search history.

(56) References Cited

U.S. PATENT DOCUMENTS

| | | |
|---|---|---|
| 1,989,077 A | 1/1935 | Bredt |
| 2,822,249 A * | 2/1958 | Jones ................... B01D 9/0059 423/198 |
| 3,965,269 A | 6/1976 | Lee et al. |
| 5,092,983 A * | 3/1992 | Eppig ....................... B09C 1/02 208/336 |
| 5,204,136 A | 4/1993 | Hellemons |
| 5,225,223 A | 7/1993 | Vitzthum et al. |
| 5,242,700 A | 9/1993 | Schlect |

(Continued)

FOREIGN PATENT DOCUMENTS

| | | |
|---|---|---|
| JP | 6521966 A | 5/2019 |
| WO | WO 2006/065236 A1 | 6/2006 |

OTHER PUBLICATIONS

U.S. Appl. No. 18/076,381, filed Dec. 6, 2022, Kalenian.

(Continued)

*Primary Examiner* — Anthony J Weier
(74) *Attorney, Agent, or Firm* — Wolf, Greenfield & Sacks, P.C.

(57) ABSTRACT

The present disclosure is generally related to systems and methods for producing liquid extracts from a solid raw material, as well as related equipment. Certain aspects are related to the production of multiple liquid extract products using a single system by adjusting one or more displaceable fluidic pathway segments within the system to switch between first and second (or more) extraction configurations. In certain embodiments, a first liquid extract can be produced when the displaceable fluidic pathway segment is in a first configuration, and a second liquid extract (different from the first liquid extract) can be produced when the displaceable fluidic pathway segment in in a second configuration (different from the first configuration).

6 Claims, 10 Drawing Sheets

(56) References Cited

U.S. PATENT DOCUMENTS

| | | | |
|---|---|---|---|
| 5,896,805 A * | 4/1999 | Katou | A47J 31/32 |
| | | | 426/433 |
| 6,203,837 B1 | 3/2001 | Kalenian | |
| 6,548,094 B2 | 4/2003 | Kalenian | |
| 6,887,506 B2 | 5/2005 | Kalenian | |
| 7,419,692 B1 | 9/2008 | Kalenian | |
| 7,875,304 B2 | 1/2011 | Kalenian | |
| 9,820,603 B2 | 11/2017 | Singer et al. | |
| 2008/0280023 A1 | 11/2008 | Kalenian | |
| 2023/0165397 A1* | 6/2023 | Kalenian | A47J 31/0663 |
| | | | 426/433 |

OTHER PUBLICATIONS

[No Author Listed], Air Cannons. VIBCO. 2001. 8 pages.
[No Author Listed], Four Kinds of Water. Vincent Corp. Jul. 9, 1996. 2 pages.

* cited by examiner

METHODS FOR PRODUCING LIQUID EXTRACTS

RELATED APPLICATIONS

This application claims priority under 35 U.S.C. § 119(e) to U.S. Provisional Patent Application Ser. No. 63/043,242, filed Jun. 24, 2020, and entitled "Systems and Methods for Producing Liquid Extracts," which is incorporated herein by reference in its entirety for all purposes.

TECHNICAL FIELD

Systems and methods for producing liquid extracts, and related equipment, are generally described.

BACKGROUND

A variety of consumable products can be made by using water and/or other consumable solvents to extract components of solid raw materials. Examples include coffee, tea, and cocoa. Typically, only one consumable product is made at a time at any one extracting location. For instance, home coffee makers simply make a single coffee beverage. As another example, industrial coffee extractors make a single feedstock for dehydration into instant coffee.

Improved systems and methods for making consumable extracts would be desirable.

SUMMARY

Systems and methods for producing liquid extracts, and related equipment, are generally described. The subject matter of the present invention involves, in some cases, interrelated products, alternative solutions to a particular problem, and/or a plurality of different uses of one or more systems and/or articles.

In certain aspects, methods of producing a plurality of liquid extracts from a solid raw material are provided.

In some embodiments, a method of producing a plurality of liquid extracts from a solid raw material comprises establishing a flow of a solvent through a bed of the solid raw material within an extraction pathway to produce a first liquid extract; displacing a segment of the extraction pathway containing at least a portion of the raw material such that the segment becomes fluidically isolated from an upstream segment of the extraction pathway and a downstream segment of the extraction pathway; and extending a solid body into the displaced segment such that the solid body compresses the portion of the raw material present within the displaced segment to produce a second liquid extract from the portion of raw material present within the displaced segment.

In some aspects, systems for producing liquid extract are provided.

In certain embodiments, a system for producing liquid extract comprises a first fluidic pathway; a second fluidic pathway; a movable solid body; and a displaceable fluidic pathway segment positioned between the first fluidic pathway and the second fluidic pathway, wherein the displaceable fluidic pathway segment is configured such that: when the displaceable fluidic pathway segment is in a first position, the displaceable fluidic pathway segment establishes fluidic communication between the first fluidic pathway and the second fluidic pathway, and when the displaceable fluidic pathway segment is in a second position, the movable solid body can be moved into and out of the displaceable fluidic pathway segment.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale unless otherwise indicated. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 1A shows the system during production of a first liquid extract. FIG. 1B shows the system during production of a second liquid extract. FIG. 1C shows the system after producing the second extract. FIG. 1D shows the system during removal of a compressed dry spent raw material selectively from the most spent fraction of the raw material in the column.

DETAILED DESCRIPTION

Figure 1A:
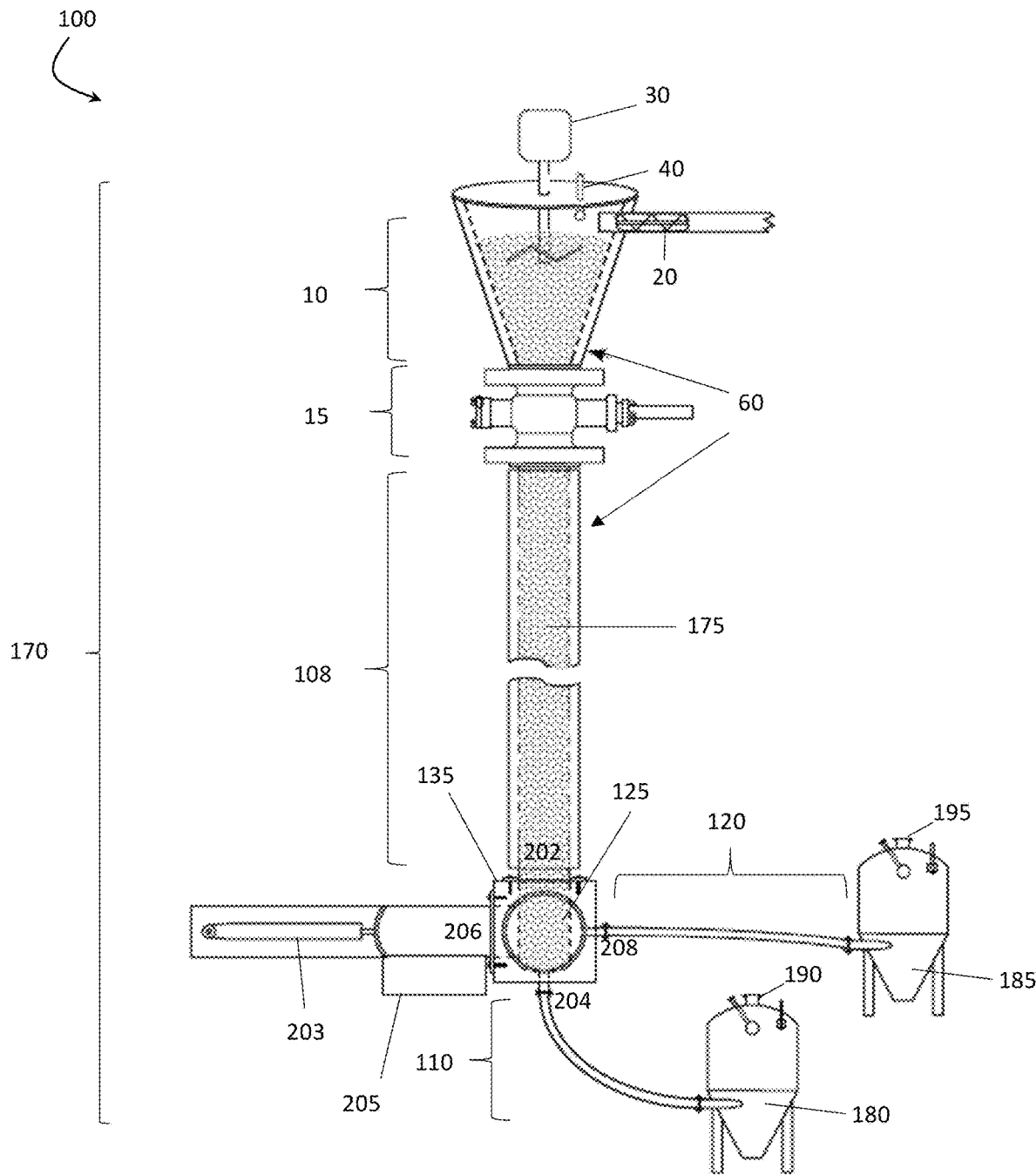
FIGS. 1A-1D are cross-sectional schematic diagrams of a system for the production of liquid extract, in accordance with certain embodiments.

The present disclosure is generally related to systems and methods for producing liquid extracts from a solid raw material, as well as related equipment. Certain aspects are related to the production of multiple liquid extract products using a single system by adjusting one or more displaceable fluidic pathway segments within the system to switch between first and second (or more) extraction configurations. In certain embodiments, a first liquid extract can be produced when the displaceable fluidic pathway segment is in a first configuration, and a second liquid extract (different from the first liquid extract) can be produced when the displaceable fluidic pathway segment is in a second configuration (different from the first configuration). The first configuration can be arranged such that the first liquid extract is produced by flowing solvent through a first fluidic pathway that includes raw material (e.g., coffee solids). The second configuration can be arranged such that the second liquid extract is produced by compressing wetted raw material (e.g., a mixture of solvent and coffee solids) and transporting the second liquid extract along a second extraction pathway that is different from the first extraction pathway. Optionally, the system may also produce a solid product (e.g., compressed dry spent coffee solids, which may be produced from the most spent raw materials in the column) when the system is in the second configuration. In this way, in accordance with certain embodiments, one can produce multiple liquid extracts having different constituents (and, optionally, at least one additional dry solid product) using a single system by altering the fluidic configuration of the system.

Many raw materials can be refined, separated, or purified into multiple "grades," allowing that raw material to be processed into numerous products, thus creating new, focused markets. Most raw materials can be made into numerous high value primary products, often creating valuable byproducts resultant of that separation. Separation technology can allow manufacturers to make an expanded portfolio of products resulting from a single production source, leading to more competitive production economics. For example, raw milk and olive oil are foods that can be made into numerous products. Each product has specific grades, resulting in very different uses and values in the marketplace. Coffee, in particular, is a raw material that is ubiquitous worldwide, but, to date, has been underutilized as a source of multiple products. As noted above, typically, when processing coffee, only one product is made at a time at any processing location. There is a lack of process and separation technology for producing multiple grades of coffee extract from a single source. One aspect of the present disclosure is the recognition that the use of a single system to produce multiple products from coffee and/or other raw materials would be advantageous. Such a system would be especially advantageous if the multiple products could be produced using non-batch processing techniques, such as continuous or semi-batch techniques.

The systems described herein may allow, in certain embodiments, for continuous production of multiple grades of liquid extracts, as well as at least one solid dry product, e.g., from the most spent raw materials. For instance, in some embodiments, the system may physically separate the most spent fraction of raw materials from an extraction pathway, remove both interstitial and absorbed extracts from that most spent fraction of the raw materials by mechanical compression, and discharge dry spent raw material as a dry solid product. It may be advantageous both economically and operationally to dispose the dry spent raw materials as dry solid product as opposed to a slurry of spent raw material in typical extraction systems.

The term "solid raw material," as used herein, refers to a solid material comprising at least one component that is a consumable material and at least one other solid component that is insoluble in a consumable solvent. The insoluble component is generally insoluble at the operating conditions (e.g., operating temperature and pressure) of the system. As used herein, the term "consumable material" refers to an extractable component of a solid raw material that can be dissolved or suspended in, and is extracted by, the consumable solvent. For example, the extractable component may be suspended in the consumable solvent under normal gravity, in certain embodiments. The term "consumable solvent," as used herein refers to an ingestible, essentially non-toxic liquid that is capable of dissolving or suspending a non-zero amount of the consumable material. In certain embodiments, it can be advantageous to use aqueous solvents. An "aqueous solvent" is a solvent that comprises water. In some embodiments, at least 50 wt % (or at least 65 wt %, at least 80 wt %, at least 95 wt %, at least 99 wt %, or all) of the aqueous solvent is water. Aqueous solvents may additionally include other components that are soluble or miscible in the water, which components may be useful or desired for particular applications. When an aqueous solvent is employed in the invention, the consumable extracts produced will be aqueous extracts.

The term "dry" solid material, as used herein, is a solid material from which at least a portion of the solvent has been removed. In some embodiments, at least 50 wt % (or at least 60 wt %, at least 70 wt %, at least 80 wt %, at least 90 wt %, at least 95 wt %, at least 99 wt %, or all) of the solvent has been removed to produce the "dry" material.

The term "spent" solid material, as used herein, is a solid material from which at least a portion of the extractable component has been extracted. In some embodiments, at least 50% (or at least 60 wt %, at least 70 wt %, at least 80 wt %, at least 90 wt %, at least 95 wt %, at least 99 wt %, or all) of the extractable components has been extracted to produce the "spent" material.

According to certain embodiments, the solid raw material comprises coffee beans, e.g., green or roasted coffee beans. The coffee beans can be ground or unground. In some embodiments, the solid raw material comprises roasted, ground coffee beans. While various embodiments herein are described as employing coffee beans, it should be understood that the disclosure is not limited to the use of coffee beans as the solid raw material, and in certain cases, solid raw materials that are not coffee beans could also be used. Non-limiting examples of other solid raw materials are provided elsewhere herein.

In accordance with certain embodiments, systems and methods described herein can be used to produce a plurality of liquid extracts from the solid raw material (e.g., a first liquid extract, a second liquid extract, and, optionally, a third, fourth, fifth, or additional liquid extract). As one illustrative example, in certain embodiments in which coffee beans are used as the solid raw material, various of the systems and methods described herein can be used to produce a beverage grade coffee extract as a first liquid extract, and an ingredient grade coffee extract as the second liquid extract. The beverage grade coffee extract may include consumable materials that are predominantly flavor and aroma components extracted from coffee beans in solution. On the other hand, the ingredient grade coffee extract may include predominantly colorant and caffeine components extracted from coffee beans in solution. In addition, in some embodiments, at least one dry solid product may be produced from the solid raw materials. In some cases, it may be advantageous (e.g., economically and/or environmentally) to process the dry solid product (e.g., in a cogeneration system or combined heat and power cycle) to produce energy and/or re-usable byproducts (e.g., fertilizers).

Certain aspects are related to a system for producing liquid extract from a solid raw material, e.g., coffee beans. The system comprises, in accordance with certain embodiments, multiple fluidic pathways for producing a plurality of liquid extracts. For instance, the multiple fluidic pathways may be arranged into different configurations during different extraction steps to produce the plurality of liquid extracts. As one example, a primary extraction pathway associated with a primary extraction step may be used to produce a first liquid extract, and a secondary extraction pathway may be associated with a secondary extraction step to produce a second liquid extract. It should be noted that the system is not limited to having only a primary pathway and a secondary extraction pathway. In other examples, extraction pathways in addition to the primary and secondary extraction pathways (e.g., a tertiary extraction pathway, a quaternary extraction pathway, etc.) may be used to produce additional liquid extracts (e.g., a third liquid extract, a fourth liquid extract, etc.).

In accordance with certain embodiments, the primary extraction pathway comprises a first fluidic pathway, a second fluidic pathway, and an adjustable displaceable fluidic pathway segment positioned between the first fluidic pathway and the second fluidic pathway. A non-limiting example of a system for producing multiple liquid extracts is illustrated in FIG. 1A. As shown in FIG. 1A, system 100 comprises first fluidic pathway 108, second fluidic pathway 110, and displaceable fluidic pathway segment 125, where the displaceable fluidic pathway segment 125 is positioned between the first fluidic pathway 108 and the second fluidic pathway 110. In accordance with certain embodiments, to produce the first liquid extract from a primary extraction step, the displaceable fluidic pathway segment may be in a first position configured to establish fluidic communication with the first fluidic pathway and the second fluidic pathway (e.g., as shown in FIG. 1A).

Figure 1B:
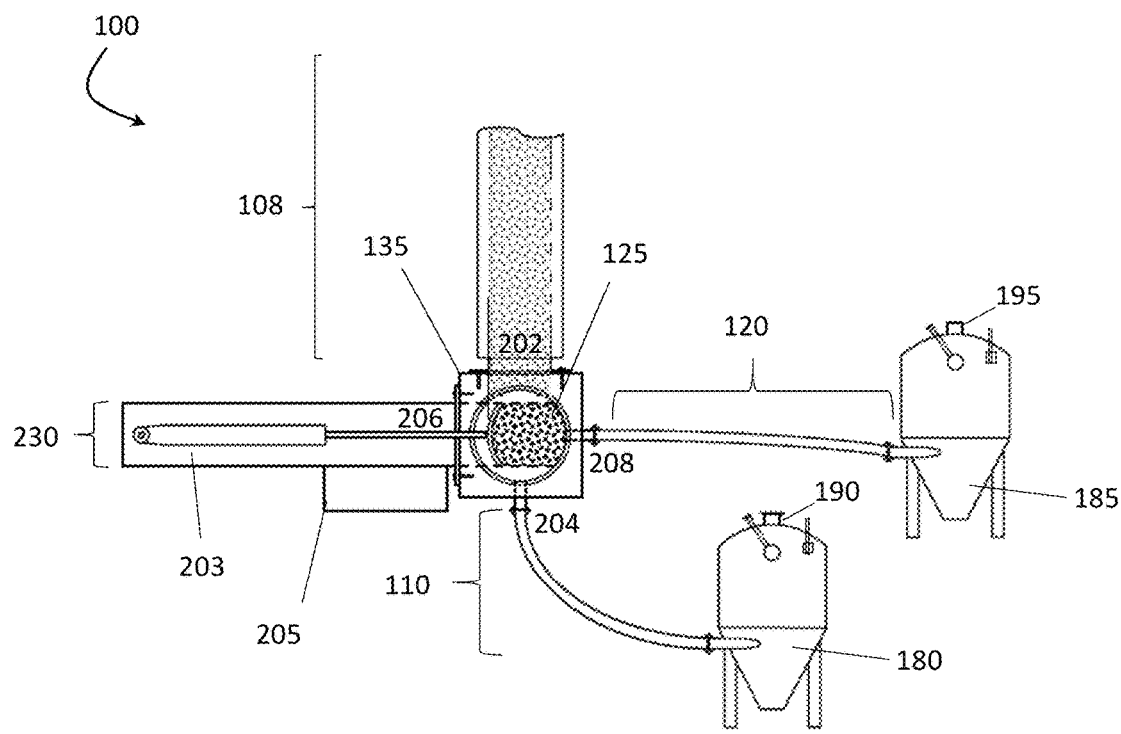

In some embodiments, the system further comprises a secondary extraction pathway comprising a movable solid body, a third fluidic pathway, and the same displaceable fluidic pathway segment from the primary extraction pathway. In accordance with certain embodiments, the displaceable fluidic pathway segment may be positioned between the first fluidic pathway and the second fluidic pathway and between the movable solid body and the third fluidic pathway. As shown in FIG. 1A, for example, system 100, in addition to comprising first fluidic pathway 108 and second fluidic pathway 110, also comprises movable solid body 203, third fluidic pathway 120, and displaceable fluidic pathway segment 125. Displaceable fluidic pathway segment 125 is positioned between first fluidic pathway 108 and second fluidic pathway 110, and it is also positioned between movable solid body 203 and third fluidic pathway 120. In some embodiments, the displaceable fluidic pathway segment can be configured to be displaced from a first position to a second position to allow for production of distinct liquid extract at each position, e.g., beverage grade coffee extract at a first position, and ingredient grade coffee extract at a second position. Accordingly, to produce a second liquid extract from the secondary extraction step, the displaceable fluidic pathway segment may be adjusted to a second position to establish fluidic communication with the third fluidic pathway and such that the movable solid body can be moved into the displaceable fluidic pathway segment (e.g., as shown in FIG. 1B).

Figure 6:
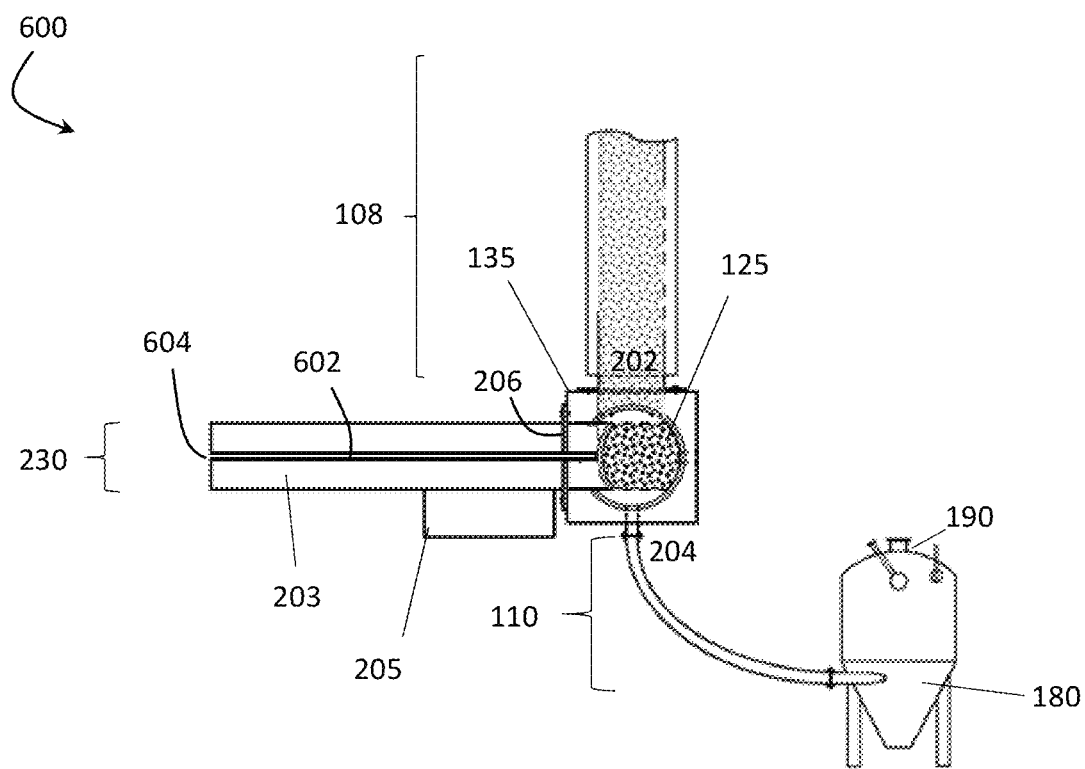
FIG. 6 is a cross-sectional schematic illustration showing a system in which liquid extract can be removed from the system via a fluid passageway within a moveable solid body, according to certain embodiments.

It should be noted that although FIGS. 1A-1D illustrate a system in which the displaceable fluidic pathway segment is positioned between a third fluidic pathway and a moveable solid body, the disclosure is not so limited, and in other embodiments, other positioning can be adopted. For instance, in some embodiments, the movable solid body may comprise an inner volume (e.g., an internal bore) through which an extract can be transported. In one embodiment, the moveable solid body comprises a screen (e.g., at or near the front of the moveable solid body). In some such embodiments, extract can be transported through the screen of the moveable solid body and out of the system via the inner volume of the movable solid body. FIG. 6 is a schematic illustration of one such system 600 that could be used in this manner. The arrangement shown in FIG. 6 is similar to the arrangement illustrated in FIG. 1B, except that port 208 is not present, and rather than transporting the secondary extract through third fluidic pathway 120, the secondary extract is transported through inner volume 602 of moveable solid body 203. In some such embodiments, when the displaceable fluidic pathway segment is in the second position (e.g., as illustrated in FIG. 6), as the movable solid body extends into the displaceable fluidic pathway segment and compresses a portion of the raw material present within the displaceable fluidic pathway segment, a liquid extract may be collected by the inner volume within the moveable solid body (e.g., 602 in FIG. 6) and subsequently transported to an external container (e.g., via outlet 604 shown in FIG. 6).

In some embodiments, the third fluidic pathway and the inner volume of the moveable solid body may both be present. For example, the moveable solid body shown in FIG. 6 could be used in conjunction with system 100 shown in FIGS. 1A-1D. In some such embodiments, the third fluidic pathway may be used as a part of the secondary extraction pathway to collect a liquid extract (e.g., a second liquid extract), and the inner volume of the moveable solid body may be used as a part of a tertiary extraction pathway to collect yet another liquid extract (e.g., a third liquid extract).

According to some embodiments, prior to extracting a plurality of liquid extracts from the system described herein, the solid raw material may be pre-wetted by a solvent in a chamber. As shown in FIG. 1A, a chamber 10 (e.g., a funnel) may be used to house the solid raw material and the solvent. The chamber may be, in some embodiments, enclosed, as shown in FIG. 1A. The solid raw material and solvent may be introduced into the chamber separately, at a desired ratio, through a solid feed device (e.g., an auger) and a liquid feed device (e.g., a spray ball). A device (e.g., a mixer), that is capable of uniformly pre-wetting and mixing the solid raw material in the solvent may be incorporated into the chamber. For example, as shown in FIG. 1A, the solid raw material may be introduced into chamber 10 via auger 20 and mixed with a solvent introduced into chamber 10 via spray ball 40 using mixer 30. In certain embodiments, the top mounted mixer 30 is designed to produce specific mixing patterns in chamber 10; for example, in certain embodiments, mixer 30 is configured to mix horizontally in layers as opposed to mixing vertically.

In some embodiments, a valve (e.g., regulator, ball valve, check valve, etc.) may be used to regulate flow of the pre-wetted solid material into an upstream segment of the extraction pathway (e.g., an extraction column). For example, FIG. 1A shows valve 15 positioned between chamber 10 and first fluidic pathway 108 that can be used to control the flow of the pre-wetted solid raw material into first fluidic pathway 108 of extraction pathway 170.

Certain embodiments comprise establishing a flow of a solvent through a bed of the solid raw material within an extraction pathway to produce a first liquid extract during a primary extraction step. In some embodiments, the extraction pathway comprises an extraction column located in a first fluidic pathway. In some embodiments, the solvent is a consumable solvent (e.g., a consumable aqueous solvent). In the extraction column, the solvent can be used to extract and/or solubilize certain consumable materials from a solid raw material. In some embodiments, the dimension (e.g., height and diameter) of the extraction column determines the length of flow path of the solvent and may be adjusted accordingly to control the Brix (e.g., concentration of an extractable component) of the resultant liquid extracts. As described elsewhere herein, a primary extraction pathway may be associated with a primary extraction step to produce a first liquid extract. In some instances, the primary extraction pathway comprises a first fluidic pathway, a second fluidic pathway, and a displaceable fluidic pathway segment (e.g., a segment that can be displaced between the first position and a second position). For example, in accordance with certain embodiments, FIG. 1A shows extraction pathway 170 containing first fluidic pathway 108, second fluidic pathway 110, and displaceable fluidic pathway segment 125 positioned between the first and second fluidic pathways, where a bed of the solid raw material may be contained in one or more portions of the extraction pathway (e.g., in both displaceable fluidic pathway segment 125 and first fluidic pathway 108). In some embodiments, the second fluidic pathway is free or substantially free of solid raw material.

In some embodiments, the flow of a solvent through a bed of the solid raw material to produce a first liquid extract can be achieved when the displaceable fluidic pathway segment is in a first position. For instance, according to certain embodiments, when the displaceable fluidic pathway segment is in a first position, the displaceable fluidic pathway segment establishes fluidic communication between the first fluidic pathway and the second fluidic pathway. For example, FIG. 1A shows a non-limiting representation of a system with displaceable fluidic pathway segment 125 in a first position, where the displaceable fluidic pathway segment 125 establishes fluidic communication between first fluidic pathway 108 and second fluidic pathway 110.

In some embodiments, the extraction pathway is substantially vertical (e.g., deviating less than 10 degrees from the vertical direction along the entirety of the extraction pathway). Given the vertical position of the extraction pathway, the flow of solvent through a bed of the solid raw material may be concurrent to gravity, such that gravity plays a role in extracting the first liquid extract.

According to certain embodiments, when the displaceable fluidic pathway segment is in a first position, the first liquid extract can flow through the primary extraction pathway into a first container. For example, as illustrated in FIG. 1A, when displaceable fluidic pathway segment 125 is in a first position (shown with its longitudinal axis in a vertical position in FIG. 1A), the first liquid extract can flow through extraction pathway 170 into first container 180. In some embodiments, the displaceable fluidic pathway segment further comprises a filter. A non-limiting example of the filter is a filter screen. The filter can be used, in accordance with certain embodiments, to inhibit or prevent the transfer of solid raw material into a portion of the extraction pathway that is downstream of the segment (e.g., into the second fluidic pathway), by preferentially allowing the first liquid extract to pass through the filter. Consequently, the first liquid extract may comprise a relatively small amount of the insoluble component of the solid raw material. In some embodiments, the first container may be a tank (e.g., swirl tank) that is used to temporarily store the first liquid extract before final packaging, or the first container itself may be a package (e.g., a bag or a pouch) that can be filled with the first liquid extract and sold directly.

Certain embodiments comprise applying vacuum to at least a portion of the extraction pathway during production of the first liquid extract. The application of a vacuum can facilitate the flow of a solvent through a bed of the solid raw material to produce a first liquid extract. In some embodiments, a vacuum may be applied to the displaceable fluidic pathway segment of the primary extraction pathway to aid in the extraction of the first liquid extract. For instance, as shown in FIG. 1A, a vacuum may be drawn from a vacuum pump 190 situated in a first container 180 and applied to a least a portion of the extraction pathway (e.g., the displaceable fluidic pathway segment 125) during production of the first liquid extract. Although the system shown in FIG. 1A-1D generally relies on gravity and vacuum as means of liquid extraction, it should be noted that in some embodiments, the extraction column may also be pressurized to facilitate the extraction process.

In some embodiments, the extraction pathway has a maximum temperature of no more than 240° F. During the production of the first liquid extract (e.g., beverage grade coffee extract), the maximum operating temperature of the extraction pathway may dictate the degree of extraction of the raw solid material (e.g., coffee beans), and consequently affect the composition of the first liquid extract. For instance, in some embodiments (e.g., in certain instances in which a beverage grade coffee extract containing predominantly aroma and flavor components is being produced), a maximum operating temperature may be no more than 240° F., no more than 230° F., no more than 220° F., no more than 210° F., no more than 200° F., no more than 195° F., no more than 193° F., or no more than 190° F. In accordance with certain embodiments, operating below the above-mentioned temperatures can prevent the denaturation of the consumable components from the solid raw material during the extraction process. In some, although not necessarily all, embodiments, operation below 200° F. can be particularly advantageous. According to some embodiments, a temperature control device (e.g., a heat exchanger) may be used to modulate the temperature in the extraction pathway. A non-limiting representation of one such embodiment is shown in FIG. 1A, where a temperature control device 60 (e.g., a water jacket) surrounds a portion of the extraction pathway 170 to maintain the temperature of the extraction pathway 170.

According to certain embodiments, the temperature in different sections of the system and/or extraction pathway can be independently controlled to allow for selective heating and cooling of different sections in the system and/or extraction pathway. For instance, the chamber (e.g., funnel) may be operated as a jacket heated vessel to increase wetting and/or blooming of the solid raw materials by controlling the temperature, optionally with the aid of a mixer. In some instances, the temperature profile of the chamber may be one at which a majority of the extractable components can be extracted from the solid raw material during the time the solid raw material resides within the chamber. In some embodiments, the maximum temperature may be no more than 200° F., no more than 195° F., no more than 193° F., or no more than 190° F. In certain embodiments, the mixer 30 or mixing impellers/augers thereof may also be heated, e.g. through incorporation of resistive heating elements. According to some embodiments, the extraction pathway(s) below the chamber (e.g., first fluidic pathway, displaceable fluidic pathway segment, second fluidic pathway, third fluidic pathway, etc.) may be operated at a lower temperature compared to the chamber to allow production of liquid extracts at a lower temperature. In some embodiments, the maximum operating temperature of the extraction pathway(s) below the chamber may be no more than 200° F., no more than 150° F., no more than 100° F., no more than 50° F., or no more than 40° F. For example, the liquid extracts may be produced as chilled or cold liquid extracts. In accordance with certain embodiments, different operating temperatures may be used to produce different liquid extracts. For instance, in some embodiments, the system may be operated at a lower temperature to produce chilled or cold liquid extracts, operated at an elevated temperature of no more than 212° F. (or no more than 200° F.) to reduce denaturation (e.g., hydrolysis, etc.) of extractable components and produce a first liquid extract (e.g., beverage grade coffee), and/or operated at greater than or equal to 212° F. to produce a different grade of liquid extract (e.g., instant coffee).

Certain embodiments comprise displacing a segment of the extraction pathway containing at least a portion of the raw material such that the segment becomes fluidically isolated from an upstream segment of the extraction pathway and a downstream segment of the extraction pathway. For example, the displaceable fluidic pathway segment may be displaced from a first position in which the displaceable fluidic pathway segment is fluidically connected to an upstream segment of the primary extraction pathway and a downstream segment of the primary extraction pathway, to a second position in which the displaceable fluidic pathway segment becomes fluidically isolated from an upstream segment of the primary extraction pathway and a downstream segment of the primary extraction pathway. A non-limiting representation of the displaceable fluidic pathway segment is shown in FIGS. 1A-1B. In one example, displaceable fluidic pathway segment 125 containing at least a portion of the raw material may be displaced from a first position in which segment 125 is fluidically connected to an upstream segment (e.g., first fluidic pathway 108) of the primary extraction pathway and a downstream segment (e.g., second fluidic pathway 110) of the primary extraction pathway as shown in FIG. 1A, to a second position, where segment 125 containing at least a portion of the raw material becomes fluidically isolated from an upstream segment (e.g., first fluidic pathway 108) of the primary extraction pathway and a downstream segment (e.g., second fluidic pathway 110) of the primary extraction pathway as shown in FIG. 1B. In some embodiments, fluidically isolating the displaceable fluidic pathway segment from the upstream segment and downstream segment of the extraction pathway stops the production of the first liquid extract. In accordance with certain embodiments, the displaceable fluidic pathway segment comprises the most spent solid raw materials. The "most spent raw materials," as used herein, describes raw materials containing the least amount of consumable materials (e.g., extractable components) along an extraction pathway.

In some embodiments, the displaceable fluidic pathway segment is part of a rotary valve (e.g., a rotary disc valve) and can be rotated from one position to another. FIG. 3B shows a non-limiting representation of rotary valve 135 comprising displaceable fluidic pathway segment 125. In accordance with certain embodiments, the rotary valve comprises 4 ports (e.g., 202, 204, 206, and 208 as shown in FIG. 3B) spaced 90 degrees apart from each other. The ports may be connected to different fluidic pathways in a system for producing liquid extracts. In some cases, the rotary valve comprise a displaceable fluidic pathway segment that may be rotated from one position to another to establish fluidic communication with different ports. For instance, as shown in FIG. 3B, rotary valve 135 may contain displaceable fluidic pathway segment 125 and may be rotated first counterclockwise and then clockwise at 90 degree increments to establish fluidic communication with different ports (e.g., 202, 204, 206, and 208). The same rotary valve 135 from FIG. 3B may be used in system 100 in FIGS. 1A-1D.

According to some embodiments, displacing a segment of the extraction pathway containing at least a portion of the raw material comprises rotating a rotary valve containing at least the portion of the raw material. As shown in FIG. 1A, in accordance with certain embodiments, rotary valve 135 comprises displaceable fluidic pathway segment 125 that contains a portion of the raw material. According to some embodiments, the portion of the raw material present in the displaceable fluidic pathway comprises the most spent raw materials. In some embodiments, the rotary valve containing at least a portion of the raw material may be rotated counterclockwise by a certain angle, e.g., 90 degrees, from a first position, where the displaceable fluidic pathway segment is in fluidic communication with an upstream segment and a downstream segment of the extraction pathway, to a second position, where the displaceable fluidic pathway segment becomes fluidically isolated from an upstream segment of the extraction pathway and a downstream segment of the extraction pathway. As shown in FIG. 1A-1B, the rotary valve 135 containing at least a portion of the raw material 165 may be rotated by a certain angle, e.g., 90 degrees, from a first position as shown in FIG. 1A, to a second position, as shown in FIG. 1B. It should be understood that displacing a segment is not necessarily limited to rotating the segment via the use of a rotary valve, and other methods of displacement involving other components may be used, as long as the segment or a portion of the segment can be displaced from one position to another to alter fluidic communication between different pathways.

Figure 1C:
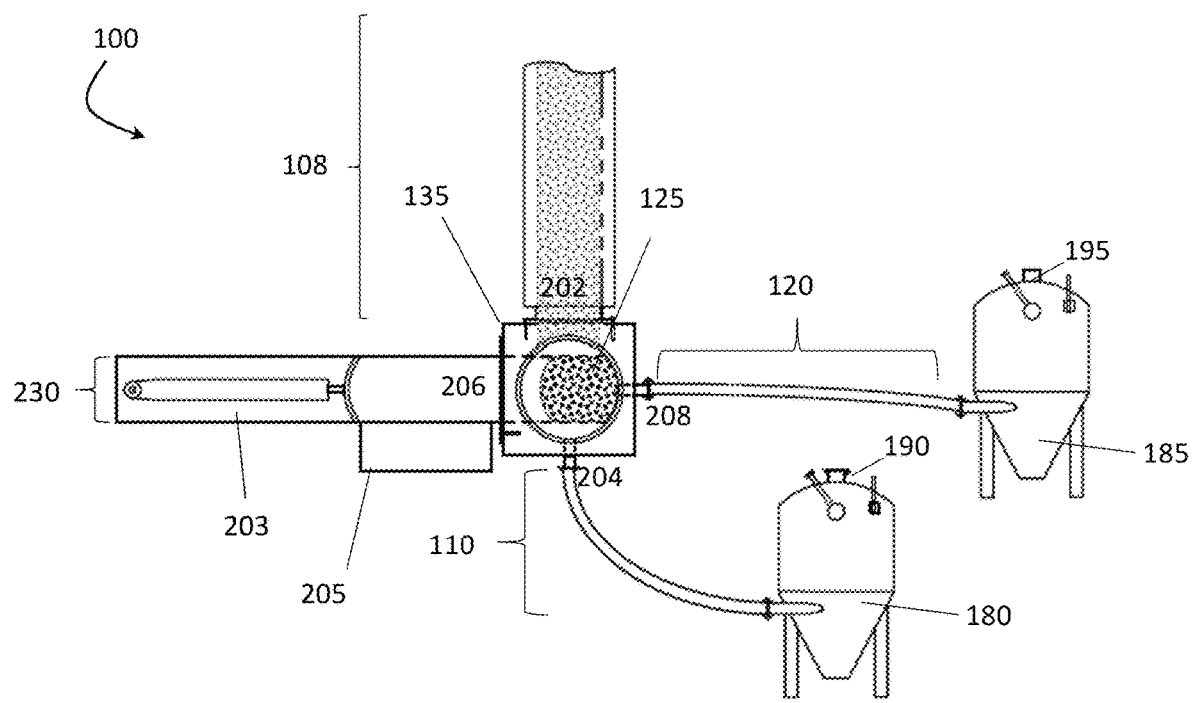

In accordance with certain embodiments, a secondary extraction pathway may be used to produce a second liquid extract. In some embodiments, when the displaceable fluidic pathway segment is in a second position, the displaceable fluidic pathway segment is in fluidic communication with the third fluidic pathway, and the movable solid body can be moved into and out of the displaceable fluidic pathway segment. FIG. 1B shows a non-limiting example of displaceable fluidic pathway segment 125 in a second position, where displaceable fluidic pathway segment 125 is in fluidic communication with third fluidic pathway 120 and movable solid body 203 can be moved into displaceable fluidic pathway segment 125. Similarly, while in the second position, the movable solid body may also be moved out of the displaceable fluidic pathway segment. For example, as shown in FIG. 1C, when displaceable fluidic pathway segment is in a second position, movable solid body 203 can be moved out of displaceable fluidic pathway segment 125. In accordance with certain embodiments, when the displaceable fluidic pathway segment is in a second position, the fluid communication between the displaceable fluidic pathway segment and the third fluidic pathway allows for the production of a second liquid extract (e.g., an ingredient grade coffee extract) from the solid raw material contained within the displaceable fluidic pathway segment.

Figure 5A:
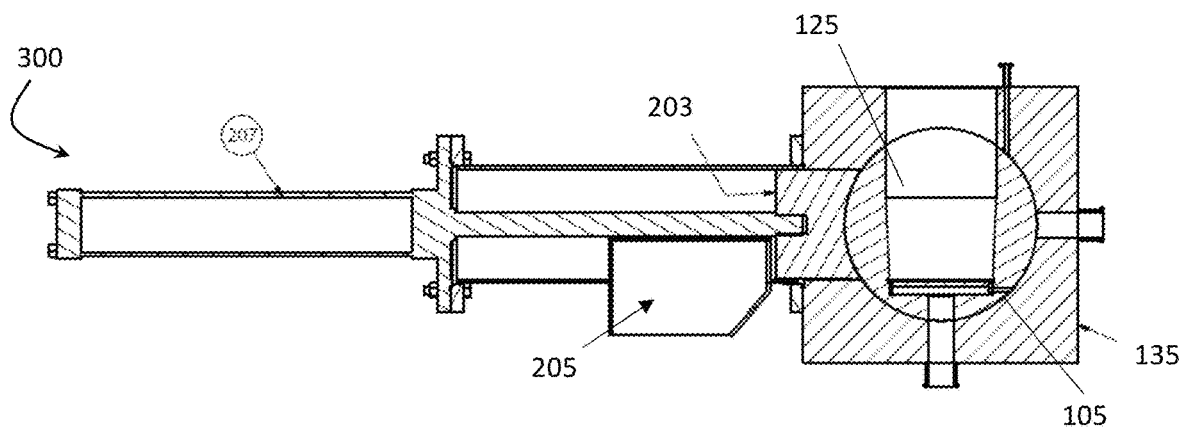
FIGS. 5A-5C are cross-sectional schematic illustrations showing the operation of an assembly comprising a hydraulic piston and a rotary disc valve in three stages, in accordance with some embodiments.
Figure 5B:
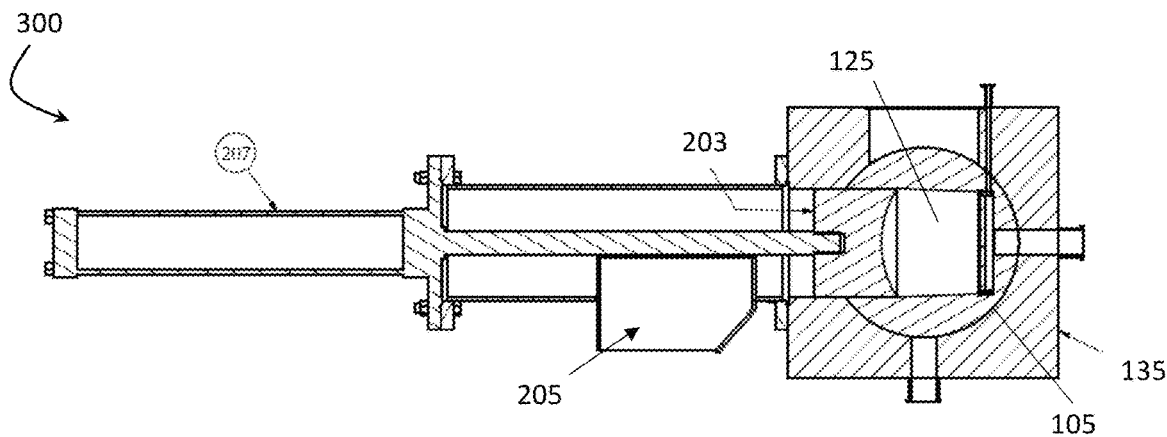
Figure 5C:
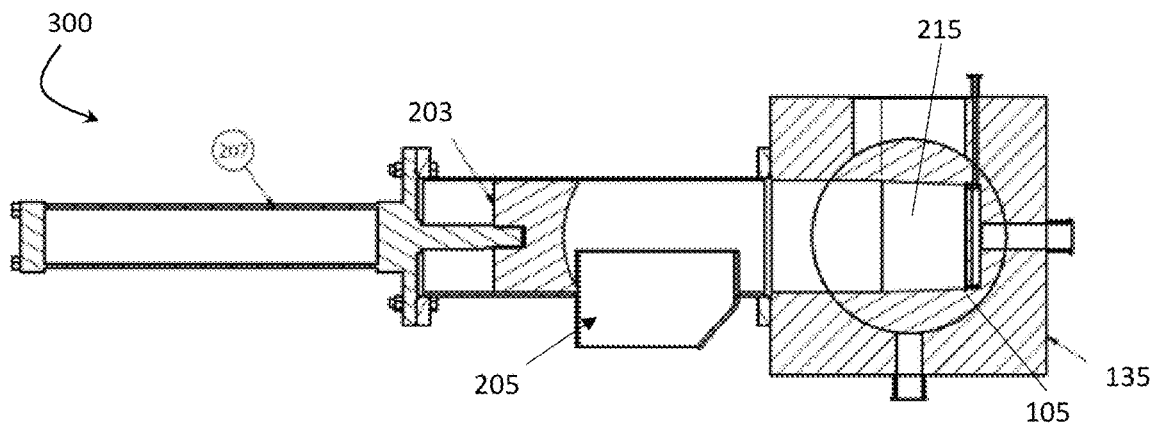

Certain embodiments comprise extending a solid body into the displaced segment such that the solid body compresses the portion (e.g., the most spent portion) of the raw material present within the displaced segment to produce a second liquid extract from the portion of raw material present within the displaced segment. In some embodiments, the movable solid body comprises a hydraulic or linear motion piston. Accordingly, in accordance with certain embodiments, extending the solid body into the displaced segment comprises extending a hydraulic piston into the displaced segment. A non-limiting example of a hydraulic piston is shown in FIGS. 5A-5C. FIG. 5A shows rotary valve 135 comprising displaceable fluidic pathway segment 125 and movable solid body 203, e.g., hydraulic piston, resting against the curved interface of valve disc 105 when rotary valve 135 is in a first position. As shown in FIG. 5B, as the rotary valve 135 rotates to a second position, the movable solid body 203 can be extended into the displaceable fluidic pathway segment 125. As shown in FIG. 5C, movable solid body 203 can also be retracted from displaceable fluidic pathway segment 125. The same hydraulic piston 203 and rotary valve 135 in FIGS. 5A-5C can be used in the extraction system illustrated in FIGS. 1A-1D.

In certain embodiments, as the solid body compresses the portion of the raw material present within the displaced segment, a second liquid extract may be produced from the portion of raw material present within the displaced segment. For instance, the solid body (e.g., hydraulic piston) may exert a sufficient force against the portion of the raw material present within the displaced segment to compress some or all of the remaining liquid components (which become the second liquid extract) out of the raw material. For instance, as shown in FIG. 1B, as solid body 203 compresses the portion of raw material present within displaced segment 125, a second liquid extract may be produced from the portion of raw material. According to certain embodiments, the solid body may compress the portion of the raw material such that at least 50 wt % (or at least 60 wt %, at least 70 wt %, at least 80 wt %, at least 90 wt %, at least 95 wt %, at least 99 wt %, or all) of the remaining extractable components are removed from the raw material present within the displaceable segment. According to certain embodiments, the solid body may compress the portion of the raw material such that at least 50 wt % (or at least 60 wt %, at least 70 wt %, at least 80 wt %, at least 90 wt %, at least 95 wt %, at least 99 wt %, or all) of the solvent is removed from the raw material present within the displaceable segment.

According to some embodiments, the second liquid extract flows from the raw material present within the displaced segment through a filter that prevents all or a majority of the insoluble solid components from leaving the displaced segment. As described elsewhere herein, in some embodiments, the displaceable fluidic pathway segment comprises a filter. In some embodiments, as the displaceable fluidic pathway segment is displaced to a second position, the filter is also displaced to a second position. A non-limiting example of the filter is a filter screen. Other non-limiting examples of filter include meshes and basket filters. Generally, any filter that can be used to separate liquid extract from the insoluble component of the solid raw material could be employed.

Certain embodiments comprise applying vacuum to at least a portion of the displaced segment during production of the second liquid extract. The application of a vacuum can facilitate the extraction of the liquid component from the raw material present within the displaced segment. In some embodiments, the vacuum may be applied to the portion of displaced segment that comprises the raw material via a third fluidic pathway. For instance, as shown in FIG. 1B, a vacuum may be drawn from vacuum pump 195 situated in a second container 185 (e.g., a swirl tank) and applied to at least a portion of displaced segment 125, via third fluidic pathway 120 during production of the second liquid extract. According to some embodiments, the vacuum may be applied at the same time as the movable solid body (e.g., hydraulic piston) extends into the displaced segment and compresses the portion of the raw material present within the displaced segment. The vacuum-assisted compression of the raw material present within the displaced segment may be used to increase the rate of production of the second liquid extract.

Certain embodiments comprise retracting the movable solid body from the displaced segment after the solid body compresses a portion of the raw material present within the displaced segment. A non-limiting representation of one such embodiment is shown in FIG. 1C. As shown in FIG. 1C, after solid body 203 compresses a portion of the raw material present within displaceable fluidic pathway segment 125, solid body 203 can be retracted. According to some embodiments, the solid body may be retracted after the compressed raw material present the displaced segment becomes dry or dewatered. As used herein, "dewatered" means that at least 50 wt % of the water initially present is removed. In some embodiments, at least 60 wt %, at least 70 wt %, at least 80 wt %, at least 90 wt %, at least 95 wt %, at least 99 wt %, or more of the water can be removed during the compression step. According to some embodiments, specific operating parameters associated with the movable solid body (e.g., hydraulic piston) can be selected based on the amount of the portion of raw material present within the displaced segment and the extent of dewatering of the raw material required. For instance, typical operating parameters may include size (e.g., length) and pressure (e.g., hydraulic pressure).

Figure 1D:
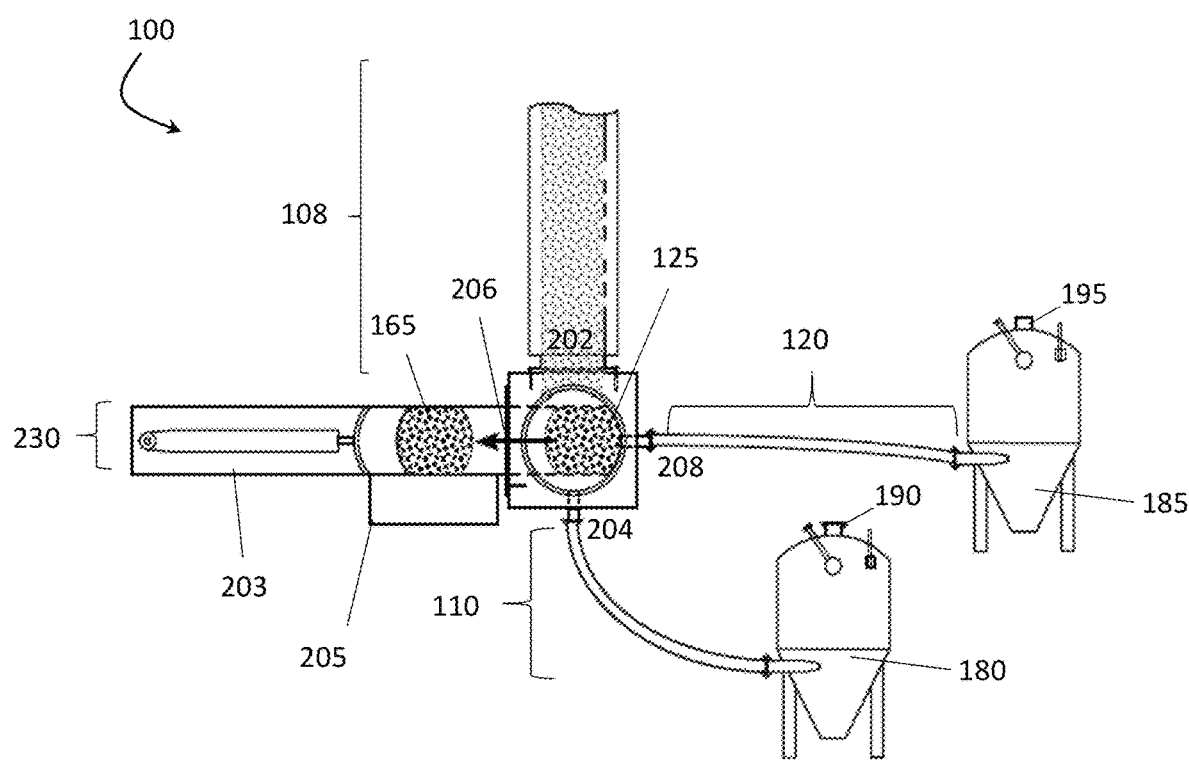
Figure 2:
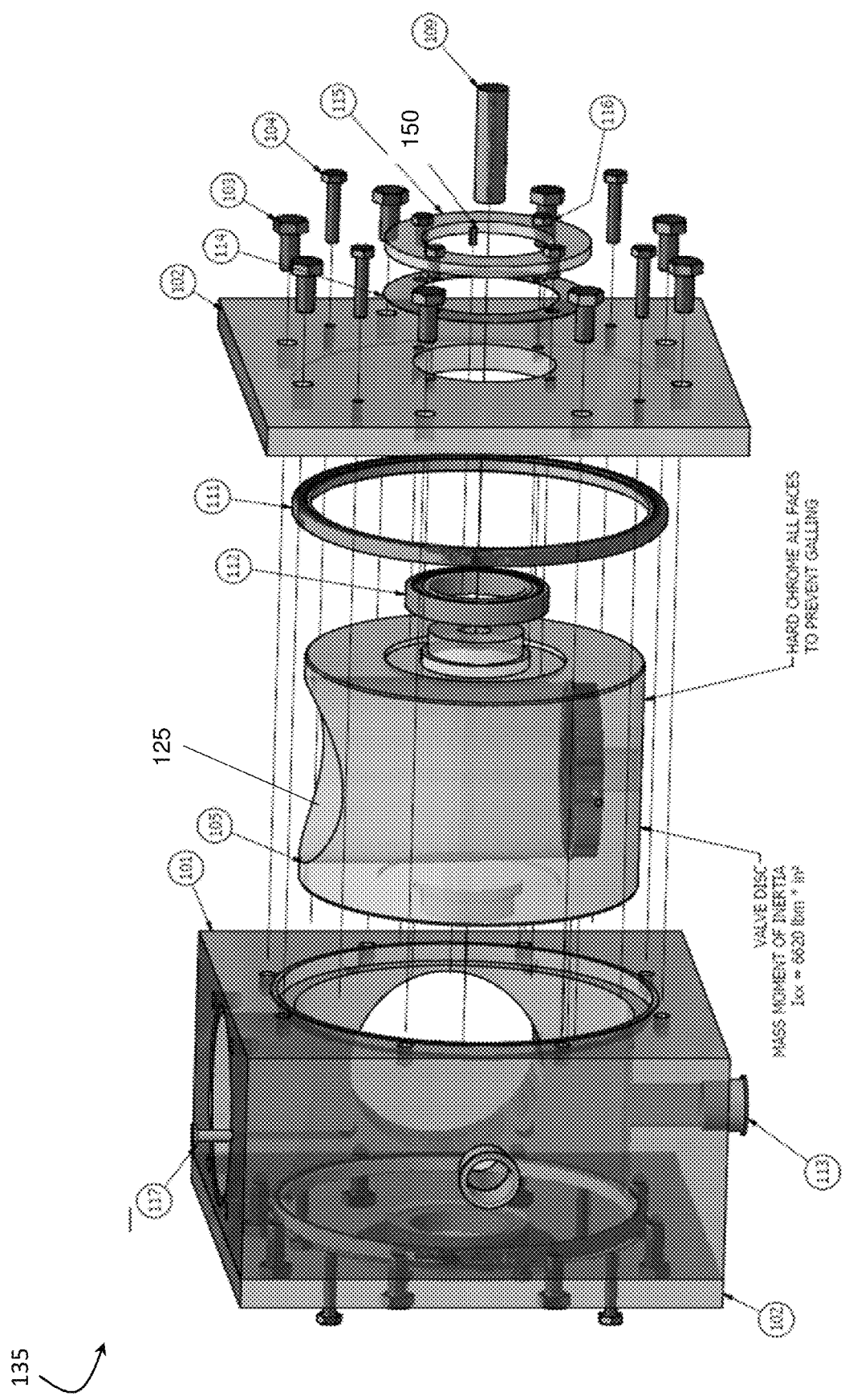
FIG. 2 is a perspective view schematic illustration of a rotary disc valve, in accordance with some embodiments.

Certain embodiments comprise removing at least a portion of the compressed raw material from the displaced segment. The compressed raw material generally comprises dry spent raw material from the extraction pathway. For instance, after retracting the solid body from the displaced segment, the compressed raw material can be removed from the displaced segment. For example, as shown in FIG. 1D, after retracting solid body 203 from the displaced segment, compressed raw material 165 may be removed from displaceable fluidic pathway segment 125. Specifically, the compressed raw material 165 may be moved in a direction away from the displaceable fluidic pathway segment 125 and disposed in a third container 205. In some embodiments, the compressed raw material can be removed from the displaced segment at the same time the solid body retracts from the displaced segment. For instance, a flow of lightly pressurized nitrogen flow may be used to remove the compressed raw material at the same time the piston retracts from the displaced segment.

According to certain embodiments, the compressed raw material is in the form of an agglomerate, e.g., an integrated mass as opposed to individual particulates. For instance, the compressed raw material may be a cake of spent coffee grounds. In some instances, the compressed raw material may be removed as one collective mass from the displaced fluidic pathway segment by applying a force on the compressed raw material, e.g., in the form of a pressurized flow of gas. For instance, certain embodiments comprise the use of an air or nitrogen cannon configured to transport raw material out of the displaced segment via highly pressurized air or nitrogen flow. In some embodiments, a lightly pressurized flow of gas, e.g., nitrogen or steam, may be used for a period of time to transport the compressed raw material out of the displaced segment.

In some embodiments, after removing at least a portion of the compressed raw material from the displaceable fluidic pathway segment, the displaceable fluidic pathway segment may be displaced back to a first position for a second round of primary extraction. For instance, certain embodiments comprise displacing a segment of the extraction pathway such that the displaceable fluidic pathway segment becomes fluidically connected to the upstream segment of the primary extraction pathway and the downstream segment of the primary extraction pathway. For example, after removing at least a portion of compressed raw material 165 from the displaced segment (as shown in FIG. 1D), displaceable fluidic pathway segment 125 may be displaced back to a first position such that segment 125 becomes fluidically connected to the upstream segment (first fluidic pathway 108) of the extraction pathway and the downstream segment (second fluidic pathway 110) of the primary extraction pathway (as shown in FIG. 1A). Specifically, in some embodiments, the displaceable fluidic pathway segment may be part of a rotary disc valve that can be rotated by a certain angle in a reverse direction (e.g., 90 degrees clockwise) from a second position to a first position. At this point, the displaceable fluidic pathway segment can receive a portion of solid raw material from the upper segment of the extraction pathway to begin a second round of primary extraction. The solid raw material from the primary extraction pathway may be drawn into the displaceable fluidic pathway segment by a gravitational pull and/or a vacuum applied to the bottom of the displaceable fluidic pathway segment. As described elsewhere herein, the vacuum may be drawn from a vacuum pump 190 situated in a first container 180 and applied to a least a portion of the extraction pathway (e.g., the displaceable fluidic pathway segment 125), as shown in FIG. 1A.

In some embodiments, the second round of primary and secondary liquid extraction may proceed as described above with respect to the first rounds of primary and secondary liquid extraction. In such cases, the extracts produced during the second rounds of primary and secondary liquid extraction can have the same or similar properties as the extracts produced during the first round of primary and secondary liquid extraction. In some embodiments, the displaceable fluidic pathway segment, the movable solid body, and the vacuum may be operated in the same or similar fashion as described elsewhere herein to produce the first primary liquid extract, second primary liquid extract, and compressed raw material, as shown in FIG. 1A-1C. The multi-step extraction process may be repeated in a continuous fashion until a desired quantity of each or either extract has been produced.

In some embodiments, the second round of primary liquid extraction may be different from the first round of primary liquid extraction such that additional liquid extracts may be generated. For instance, certain embodiments comprise establishing a second flow of solvent through a bed of solid raw material within the extraction pathway to produce a third liquid extract. In some instances, a second solvent different from the solvent used in the first round of extraction can be used to establish a second flow of solvent through a bed of solid raw material within the extraction pathway to produce a third liquid extract. For example, the second solvent may be different from the first solvent and can be used to solubilize and/or extract different components from the raw solid material (e.g., coffee beans). Consequently, a vacuum-assisted extraction similar to the vacuum-assisted extraction used in producing the first liquid extract as shown in FIG. 1A may take place to produce the third liquid extract.

In some embodiments, the displaceable fluidic pathway segment may have additional positions allowing for the production of additional liquid extracts (e.g., three, four, or more liquid extracts). For instance, the displaceable fluidic pathway segment may be displaced to multiple extraction pathways (e.g., primary, secondary, tertiary, quaternary, or more pathways) for the production of more than two types of liquid extracts. In some embodiments in which more than two extracts are produced, each of the three (or more) different types of liquid extract may be transported out of the system via a separate fluidic pathway (and, optionally, to separate containers) or reintroduced into the mixer funnel as enhanced solvent.

The multi-step extraction process described herein may be operated in a variety of different orders. For instance, in some embodiments, the multi-step extraction process may occur in the following order: a first primary extraction step producing a first liquid extract, a first secondary extraction step producing a second liquid extract from a first portion of compressed raw material, removal of the first portion of compressed raw material, a second primary extraction step producing a third liquid extract, a second secondary extraction step producing a fourth liquid extract from a second portion of compressed raw material, and removal of the second portion of compressed raw material. In such embodiments, the multi-step extraction process may be operated continuously repeating the same multi-step extraction process.

In some embodiments, the multi-step extraction process may involve a single round of primary extraction to produce a first liquid extract, followed by multiple rounds of secondary extraction to produce a secondary liquid extract, and removal of compressed raw materials. For instance, in some embodiments, the multi-step extraction process may occur in the following order: a single round of primary extraction of the entire length of the extraction column may be first carried out to selectively and exhaustively extract a first liquid extract from the majority of the solid raw material within the primary extraction pathway, followed by multiple rounds that alternate between a secondary extraction step and a solids removal step until a majority or all of the solid raw materials within the primary extraction pathway have been removed, followed by replenishing the primary extraction pathway with another batch of solid raw material through which an additional step of primary extraction is performed.

In some embodiments, the system may be operated to produce a single liquid extract. For instance, the system may be operated such that either a first liquid extract or a second liquid extract is produced. For example, the system may be configured accordingly to produce either a first liquid extract via a primary extraction pathway (while disabling the secondary extraction pathway), or a second liquid extract and a dry solid product via the secondary extraction pathway (while disabling the primary extraction pathway).

The operation of the multi-step extraction process is not limited to these examples described herein, any other methods of performing the multi-step extraction may be deemed appropriate, depending on the application.

In some embodiments, the first liquid extract (from the primary extraction process) and second liquid extract (from the secondary extraction process) may be processed and packaged separately as different products. In some embodiments, the first liquid extract and the second liquid extract may be combined into one liquid extract and packaged as a single product. In some embodiments, one or more of the plurality of liquid extracts from one round of extraction may be used as the solvent for subsequent rounds of primary and secondary extraction to increase the Brix of the resultant liquid extracts from the subsequent round of extraction. For instance, a first liquid extract from a first round of primary extraction may be used as the solvent for a second round of primary extraction to produce a first liquid extract with a higher Brix value in the second round of primary extraction.

For example, an ingredient grade extract from a first round of extraction may be reintroduced as an enhanced solvent into a second round of extraction to result in an enriched extract with higher concentration of extractable components.

According to some embodiments, the multi-step extraction process may be automated. Automation can allow, in accordance with certain embodiments, for continuous operation and, optionally, without the need for frequent emptying, cleaning, sterilizing, and refiling procedures. The continuous operation of the multi-step process may reduce cost (resulting in a decrease in cost per unit output of liquid extract) and/or may require less floor space (thus lowering capital costs).

In some embodiments, the multi-step extraction process may be programmed to automate one or more of the extraction steps described elsewhere herein (e.g., primary extraction, secondary extraction, removal of compressed raw materials (e.g., a dry solid product comprising dry spent raw materials), filling and/or refiling of the solid raw material, etc.). According to certain embodiments, displacement of the displaceable fluidic pathway segment from a first position to a second position (and/or from the second position back to the first position) may be automated. For instance, in some embodiments, when the displaceable fluidic pathway segment is in a first position (to produce a primary liquid extract), a sensor (e.g., an in-line Brix or volume meter) may be used to detect one or more components in the primary liquid extract exiting the displaceable fluidic pathway segment. Data provided by the sensor can be used by one or more controllers to provide programmable and/or self-automation control of the device or system, to facilitate various control schemes and algorithms, and/or to facilitate programmed actuation of the displaceable fluidic pathway segment. For instance, in some embodiments, once the sensor detects a concentration that is below a threshold concentration of the component(s) in a primary liquid extract, the displaceable fluidic pathway segment can be actuated to be displaced to a second position to remove fluidic communication between the displaceable fluidic pathway segment and the upstream and downstream portions of the primary extraction pathway, ceasing production of the first liquid extract.

In some embodiments, once the displaceable fluidic pathway segment is displaced to a second position configured to produce a second liquid extract, the controller may initiate actuation of the movable solid body (e.g., hydraulic piston) to extend into and retract out of the displaceable fluidic pathway segment, for example, based on a pressure set point of the movable solid body. In some embodiments, after retracting the movable solid from the displaceable fluidic pathway segment, the controller may initiate removal of the compressed dry spent raw material. In some embodiments, after the removal of the compressed dry spent raw material, the controller may initiate actuation of the displaceable fluidic pathway segment such that it is displaced from the second position back to the first position.

In some embodiments, the controller used to control actuation of the various components (e.g., displaceable fluidic pathway segment, movable solid body, etc.) during the extraction process may comprise a computer processor. For instance, the processor can be used to control actuation of the displaceable fluidic pathway segment based on data received from the sensor (e.g., in-line Brix sensor). The processor can also be used to control actuation of the movable solid body based on a hydraulic pressure set point. In some instances, the actuation of various components may be controlled by setting a time duration or volume duration in the controller. This can allow a user or an external operator, with communications access to the controller, to adjust a setting (e.g., Brix value, pressure set point, time duration) and/or to change an operating mode in response to the measured values provided by the sensors. For instance, an operator may manually input (e.g., via a graphical user interface (GUI)) a desired Brix set point and/or pressure set point of the controller to allow actuation of the displaceable fluidic pathway segment and/or the movable solid body. In certain embodiments the controller and system design may result in the ability to achieve surprising and unexpected levels of consistency and reproducibility in extract composition and quality.

In some embodiments, the extraction system may be configured such that the solid raw material and the extract are sealed from the external environment. Sealing the extraction system can help reduce or eliminate denaturation (e.g., volatile aroma loss) and/or loss of the consumable extracts (e.g., via oxidation and/or evaporation) and/or contamination of the extraction system.

As noted above, any of a variety of solid raw materials may be employed. Non-limiting examples include a variety of organic solids from which consumable materials can be extracted such as, for example, roasted coffee, green coffee, ground or whole coffee, cocoa, fruit, vanilla beans, and tea leaves.

As noted above, in certain embodiments, the use of systems and methods described herein can be particularly advantageous for coffee extraction. In some embodiments, the primary extraction configuration can be used to produce a beverage grade coffee extract. The beverage grade extract may contain, in some embodiments, about 1-4 wt % dissolved coffee solids. Generally, the beverage grade extract (e.g., a beverage grade coffee extract) may have a higher Brix value than the ingredient grade extract. In some embodiments, the beverage grade extract has a Brix value that is at least 0.1 Brix higher, at least 0.5 Brix higher, at least 1 Brix higher, at least 2 Brix higher, or at least 5 Brix higher, than the ingredient grade extract. In some embodiments, the beverage grade extract has a Brix value that is greater than or equal to 20 Brix, greater than or equal to 23 Brix, or greater than or equal to 25 Brix.

According to certain embodiments, the first liquid extract comprises at least 2 wt % more of the primary consumable material (e.g., an extractable component of a solid raw material) than the second liquid extract. The primary consumable material refers to the consumable material that is most soluble in the solvent used to perform the extraction and will generally differ depending upon the type of solid raw material being extracted. Those of ordinary skill in the art would be capable of determining the primary consumable material for a given solid raw material. In some embodiments, the first liquid extract comprises at least 2 wt %, at least 5 wt %, at least 10 wt %, at least 20 wt %, or at least 30 wt % more of the primary consumable material than does the second liquid extract.

In some embodiments, the beverage grade extract (e.g., the beverage grade coffee extract) comprises at least 2 wt % (or at least 5 wt %, at least 10 wt %, at least 20 wt %, or at least 30 wt %) more aroma compounds than does the ingredient grade extract (e.g., ingredient grade coffee extract).

In certain embodiments, the beverage grade extract (e.g., the beverage grade coffee extract) comprises at least 2 wt % (or at least 5 wt %, at least 10 wt %, at least 20 wt %, or at least 30 wt %) more sugar than does the ingredient grade extract (e.g., ingredient grade coffee extract).

In certain embodiments, the secondary extraction configuration can be used to produce an ingredient grade coffee extract. The ingredient grade coffee extract may be a coffee extract having a lower Brix number and a higher viscosity, relative to the primary extract. The ingredient grade coffee extract may also have with a lower water content, greater colorant content, a stronger coffee flavor, a larger amount of caffeine, and reduced aroma. In some embodiments, the ingredient grade extract (e.g., ingredient grade coffee extract) has a brix value that is less than or equal to 25 Brix, less than or equal to 23 Brix, or less than or equal to 20 Brix.

In some embodiments, the ingredient grade extract (e.g., the ingredient grade coffee extract) comprises at least 2 wt % (or at least 5 wt %, at least 10 wt %, at least 20 wt %, or at least 30 wt %) more caffeine than does the beverage grade extract (e.g., beverage grade coffee extract).

In some embodiments, the pH of the ingredient grade extract (e.g., the ingredient grade coffee extract) is at least 0.2 (or at least 0.4, at least 0.6, at least 0.8, at least 1.0, at least 1.5, or at least 2.0) lower than the beverage grade extract (e.g., the beverage grade coffee extract).

The following examples are intended to illustrate certain embodiments of the present invention, but do not exemplify the full scope of the invention.

Example 1

This example illustrates a coffee extractor that has three or more separate, selectively variable, and measurably distinct output streams: two liquid streams and one dewatered solid spent grounds stream. The ratio between these three streams can be intentionally controlled by numerous operational choices into: 1) beverage grade coffee extract (e.g., a ultra-high "beverage" grade coffee extracts maintaining full flavor and full aroma beyond typical coffee beverage parameters, with immeasurable solids in suspension); 2) "ingredient" grade coffee extracts (e.g., an extract with a higher brix and viscosity, lower water content, greater colorant content, stronger coffee flavor, greater caffeine, and reduced aroma); and 3) a dried coffee grind "cake" or granules mechanically dewatered of "free water" compressed into briquettes (e.g., suitable for biomass fuel, or agricultural soil enhancement due to its high nitrogen and carbon content). The continuous extraction of multiple grades of liquid coffee extracts can provide not only new value added economies, but also makes the production of a previously unaffordable ultra-grade "beverage" grade coffee extracts more economical by the production and sale of the ingredient grade extract, and dry spent coffee grind waste.

The continuous nature of this 2-channel extraction process can allow for immediate and continuous production of beverage grade and ingredient grade coffee extracts, thus eliminating the need for large holding tanks for post extraction homogenization or concentration steps. This extractor can be fully automated and operated 24/7 for "lights out production" without the frequent emptying, cleaning, sterilizing, testing, and refilling procedures common to and typical of the single and multi-column systems for coffee extraction. The continuous operation of this extractor therefore can cost less per unit output and require vastly less floor space, have less stringent floor to ceiling height requirements, and lower capital cost than prior designs. As a sealed system, oxidation, aroma loss, and sterilization issues can be reduced.

One example of the coffee extractor with a 4-step function diagrams is illustrated in FIGS. 1A-1D. The size, shape, volume and methods of use detailed here are but one example of numerous forms that the extraction system may take, as would be achievable by one skilled in the art given the insight provided by the present disclosure.

Production of Beverage Grade Extract

FIG. 1A shows a single sealed, stainless steel, double wall jacketed, and heatable and/or coolable extraction column 108 that in this case has an aspect ratio of 15 to 1. In the example shown in FIG. 1A, the column has an 8-inch diameter and a 120-inch height, but other dimensions and/or ratios could also be used. The extraction column of this example has an enclosed, gas-tight interior for housing liquid, polished to NSF food grade specifications, with a fully jacketed counter current heatable jacketed exterior shell 60. The extraction column has 8-inch ANSI flanges at the top and bottom. The top 8-inch diameter ANSI flange supports an 8-inch full port ball valve 15, and atop that, a conical "slurry mixing" hopper 10. This hopper allows dry coffee grounds (which may have a particular sieve size) and heated water (which may have a particular temperature and chemical makeup) to be mixed thoroughly via a slowly rotating mixing paddle system 30, contained within a gas-tight lid. Penetrating through the top portion of the sealed hopper is a controlled input feed auger 20 and controlled temperature (hot or cold) water spray ball 40 providing the desired ratio of grounds to water. The slurry hopper has both temperature and level controls with proportioning controls for solvent and raw product to be extracted.

Initially the dry coffee grounds and hot water are pre-mixed in the hopper with the ball valve outlet closed. When the ball valve is opened (typically just once at start up, unless different grades, roasts, or blends need to be processed) gravity fed and vacuum assisted flow transports the pre-wetted grounds into the extraction column below it. This arrangement has numerous advantages including thorough wetting, increased contact time between the solvent and grounds for "blooming," and uninterrupted flow. The mixing hopper and extraction column could have approximately the same holding capacity, thus doubling the residence time of the mixture prior to extraction.

For example, the mixture hopper could be heated to an appropriate extraction temperature for an appropriate amount of time with the desired blend of solvent and solid raw materials. Once mixed, the column could be chilled such that the slurry is extracted cold to produce chilled coffee extracts. In some cases, the temperature of mixing and the duration of mixing at that temperature in the hopper can affect the extraction process more than the temperature of the mixture at the moment of separation, e.g., to form liquid extracts.

The flow of solvent within the extraction column is substantially parallel to the direction of gravity. The system can be operated to be vacuum driven, without application of a positive pressure except gravity head, which may be controlled. In such a configuration, the vessel need not be ASME stamped or regulated. As shown in FIG. 1A, the downward flow of solvent, in the direction of gravity, is assisted by vacuum (e.g., via one or more remote vacuum pump systems 190 or 195, or one central vacuum pump) pulling extracts through chillers past Brix meter(s) and/or flow meter(s) (not shown) into food grade sealed swirl tanks 180 and 185. Diaphragm pumps could be used in place of the vacuum pumps 190 and 195 to produce a lower density, non-degassed extract if desired. As shown in FIG. 1A, the vacuum pumps 190 and/or 195 may pull on each swirl tank's top orifice (e.g., beverage grade swirl tank 180 and/or ingredient grade swirl tank 185). While the premium beverage swirl tank can be used to house the beverage grade coffee extract, the ingredient grade swirl tank can be used to house ingredient grade coffee extract. The swirl tanks have in line chillers (not shown) positioned between the extraction column's outlets and the swirl tanks input. Each tank allows nearby storage downstream of the extraction column, with limited capacities for short term holding and degassing of the two grades of extracts produced, e.g., a beverage grade extract and an ingredient grade extract.

As shown in FIG. 1A, attached to the flanged base of the vertical or near vertical extraction column 108 is a 25-inch motorized rotary disc valve 135 custom machined with at least 4 ports (which for this example) are described as port 202, port 204, port 208 and port 206. The 25-inch motorized rotary disc valve can be made of, for example, stainless steel. There are two short (2-inch) sanitary style orifices on port 208 and port 204 sides to allow discharge of premium beverage grade extract (through port 204) and ingredient grade extract (through port 208). The port 202 and the port 206 are shown as 8-inch flanged orifices in this example. The 25-inch motorized rotary disc valve is described in more detail below. FIG. 2 and FIGS. 3A-3C show the perspective views of the motorized rotary disc valve, (FIG. 2—side view, FIG. 3A—top view, FIGS. 3B-3C—cross-sectional views). The rotary disc valve 135 includes the following components: a rotatable valve disc 105, a displaceable fluidic pathway segment 125 (e.g., internal bore), and various components associated with rotary disc valve (e.g., a rinse ferrule 117, a weld ferrule 113, a rotary valve seal 111, a roller bearing 112, a front cover 102, valve shaft key 150, valve axial shaft 109, side cover bolt 103, jacking bolt 104, axial position bolt 116, axial position flange 115, axial position shim 114, screen retainer 106, screen 107, screen spring clip 118, etc.) While rinse ferrule 117 is illustrated as pointing upward in FIG. 2, in other embodiments, rinse ferrule 117 may be pointed downward (e.g., to assist with draining).

Figure 3A:
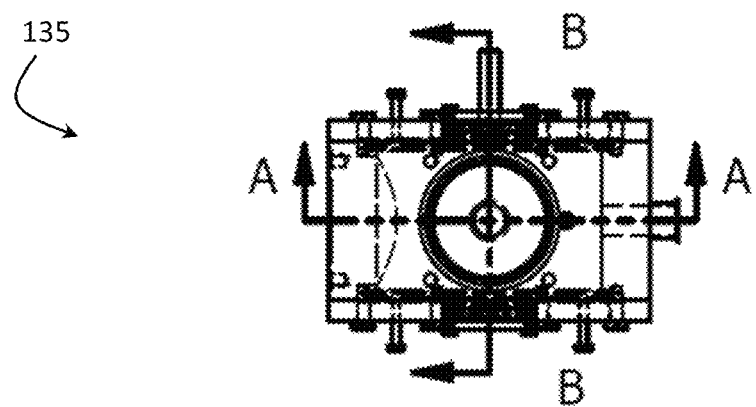
FIGS. 3A-3C are schematic illustrations of a rotary disc valve in top view (FIG. 3A) and two cross-sectional views (FIGS. 3B-3C), in accordance with some embodiments.
Figure 3B:
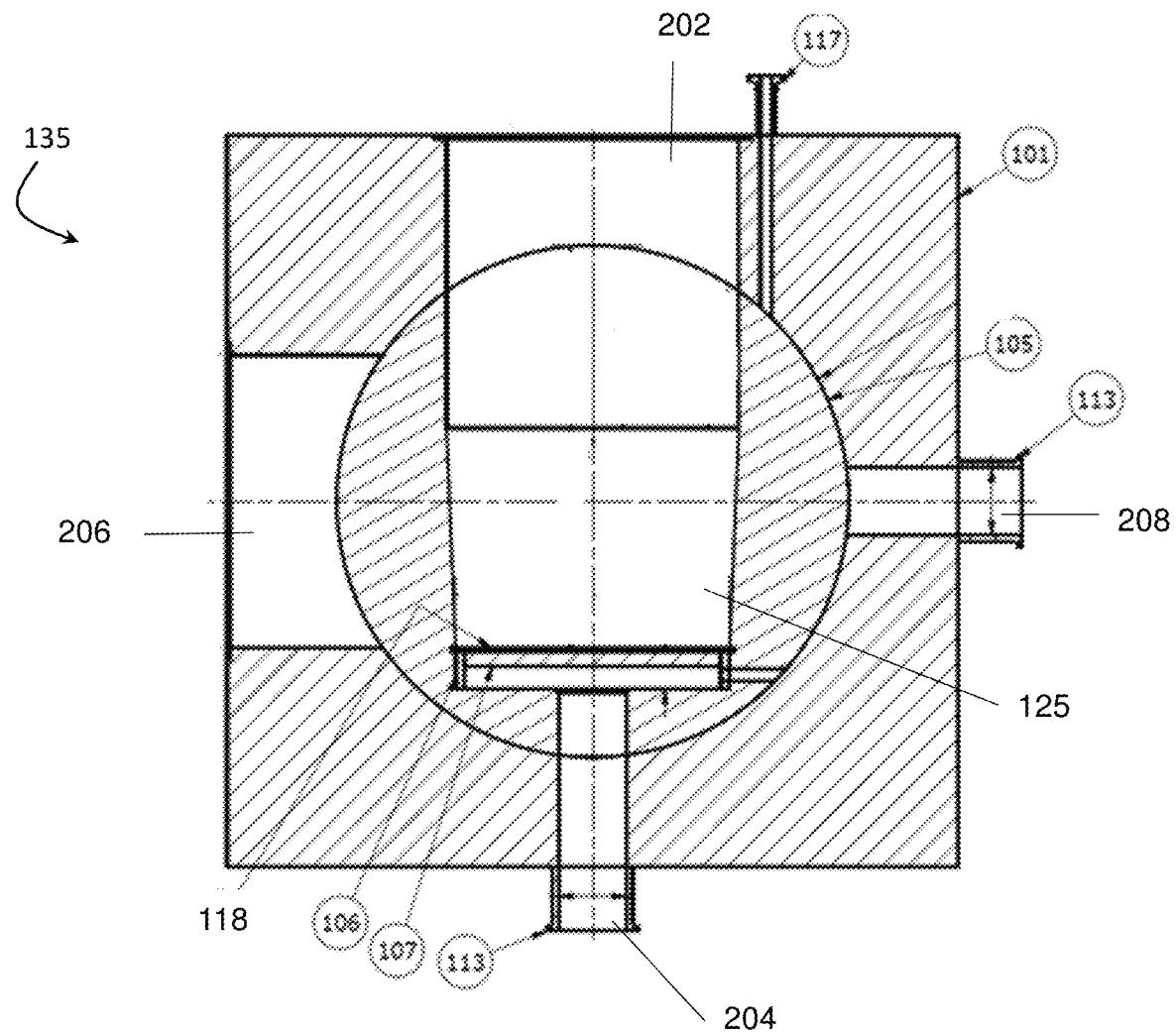
Figure 3C:
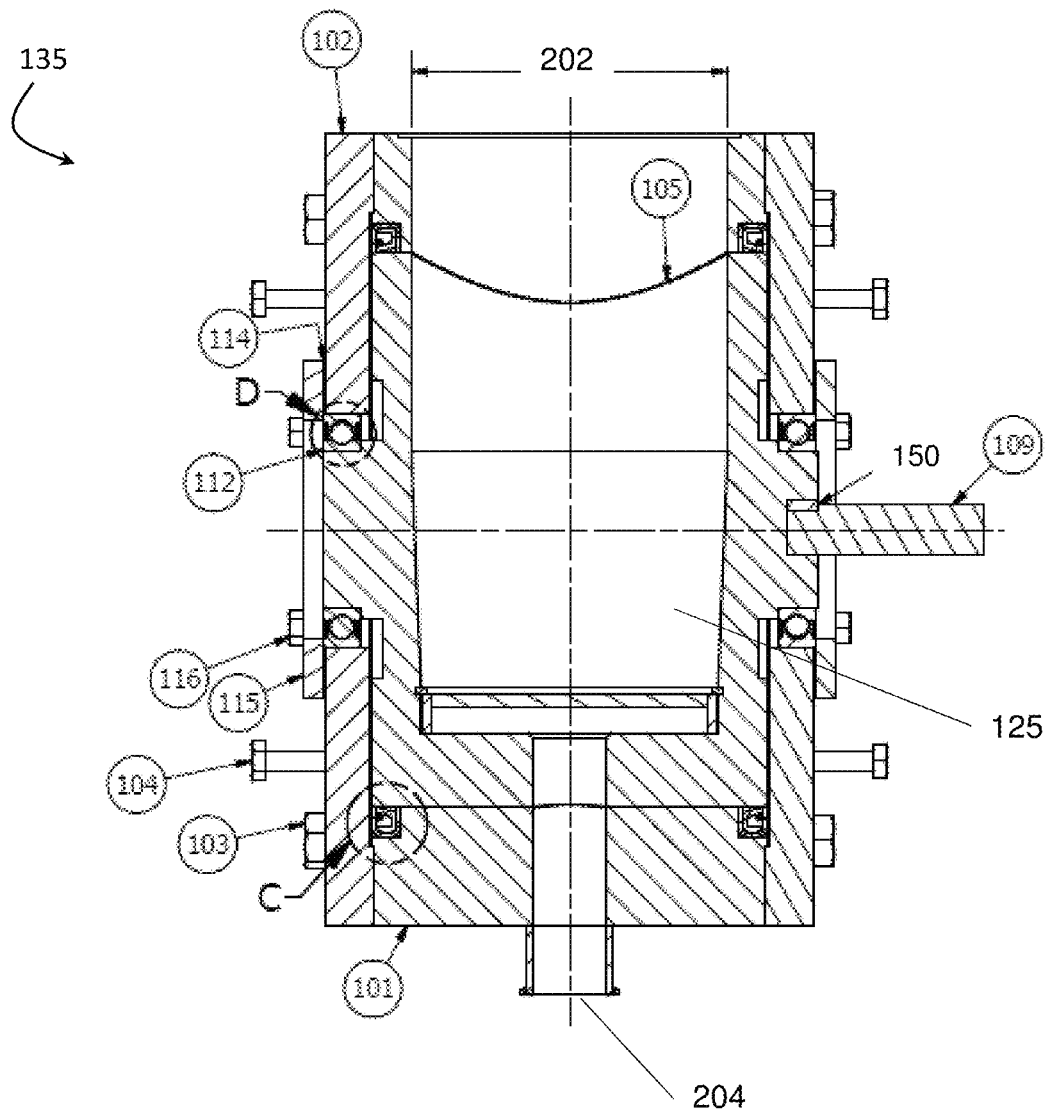

FIG. 3A provides a top view illustration of the motorized rotary disc valve 135. A cross-sectional view of section A-A of rotary disc valve 135 in FIG. 3A is presented in FIG. 3B. As shown in FIG. 3B, rotary disc valve 135 has 1 displaceable fluidic pathway segment 125 (i.e., internal bore). The bore in the rotary disc valve is not full depth, but is about 85% of the diameter of rotatable valve disc 105. In this example, rotary disc valve 135 has a 22-inch rotatable valve disc 105 having a cylindrical bore with a 8-inch diameter. This bore has a "base" with a retaining ring 106 machined into the end facing port 204, for a removable, replaceable filter 107 (e.g., a Johnson screen). This filter is removable but cannot come loose in use. The bore in the rotary disc valve has a shoulder at the base to support the filter, and a smaller discharge orifice below the screen to allow gathering and flow of all grades of extract.

As shown in FIG. 3B, the removable filter is held "on top" by an oversize shouldered bore which is machined to fit snugly on its outer diameter (OD) into the inner diameter (ID) of the internal bore 125. This filter will have an OD with the same ID as the internal shoulder bore in the rotary disc valve. The interchangeable filter is held by a spring clip 118 or equivalent under the screens support puck. This removable filter assembly is retained at its bottom by a substantial spring clip in the valve bore's base, and a groove machined into its ID, that supports the filter from downward movement by the matching an annular ring machined and spring clip groove into the 8-inch bore of the rotary disc valve. The removable, interchangeable filter is inserted into the rotary disc valve's 8-inch bore, at or near its bottom, with any needed screen support bars facing down, below the screen. The rotary disc valve body has a 8-inch drilled and tapped ANSI pattern flange facing port 202 that seals the 120-inch vertical extractor column's bottom, forming its base.

In normal use, the 25-inch motorized rotary disc valve body (which contains a 22-inch diameter valve disc comprising a straight 19.5-inch bore having an inner diameter of 8 inches and a bore length of 22 inches) accepts a slurry of spent coffee grounds from the bottom of the 120-inch extraction column (FIG. 1A). These coffee grounds enter via the port 202 of the rotary disc valve into its internal bore.

To produce a beverage grade extract, the 8-inch internal bore is aligned to port 202 and port 204 (FIG. 1A). The beverage grade extract vacuum flow is on, allowing flow out of the beverage grade extract from the 2-inch sanitary style orifice of port 204 into beverage grade swirl tank 180. A vacuum pump 190 can be used to supply vacuum motivation at the top of the beverage grade swirl tank 180 to facilitate flow of the extract. The beverage grade extract exiting out port 204 into swirl tank 180 is monitored by an in-line Brix meter and/or flow meter that controls the rotary disc valve actuator. When the in-line Brix meter and/or volume measurement reaches desired set point level, the rotary disc valve 135 rotates 90 degrees counterclockwise to a second position (FIG. 1B), cutting off flow to port 204, and moving the rotary disc valve's internal bore such that it aligns with port 208, as shown in FIG. 1B-1D. At this point, the production of beverage grade extract has ceased.

Production of Ingredient Grade Extract

The rotary disc valve is now facing port 208 and port 206 (FIG. 1B), allowing for the extraction of an ingredient grade extract. The new bottom drain ½ inch port 208 has at least one closely coupled 2-way motorized sanitary ball valve (not shown) to allow discharge of ingredient grade extract aided by vacuum suction from the ingredient grade swirl tank 185 and piston pressure applied by a hydraulic piston 203. The operation of a hydraulic can be explained using a detailed schematic of hydraulic piston assembly 200 in FIG. 4A-4C.

Figure 4A:
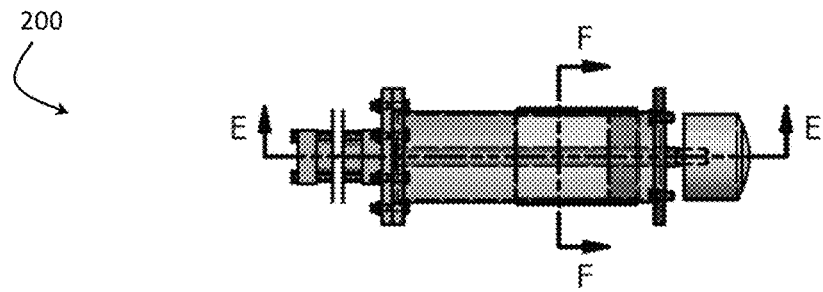
FIGS. 4A-4C are schematic illustrations of a hydraulic piston assembly in top view (FIG. 4A) and two cross-sectional views (FIGS. 4B-4C), in accordance with some embodiments.
Figure 4B:
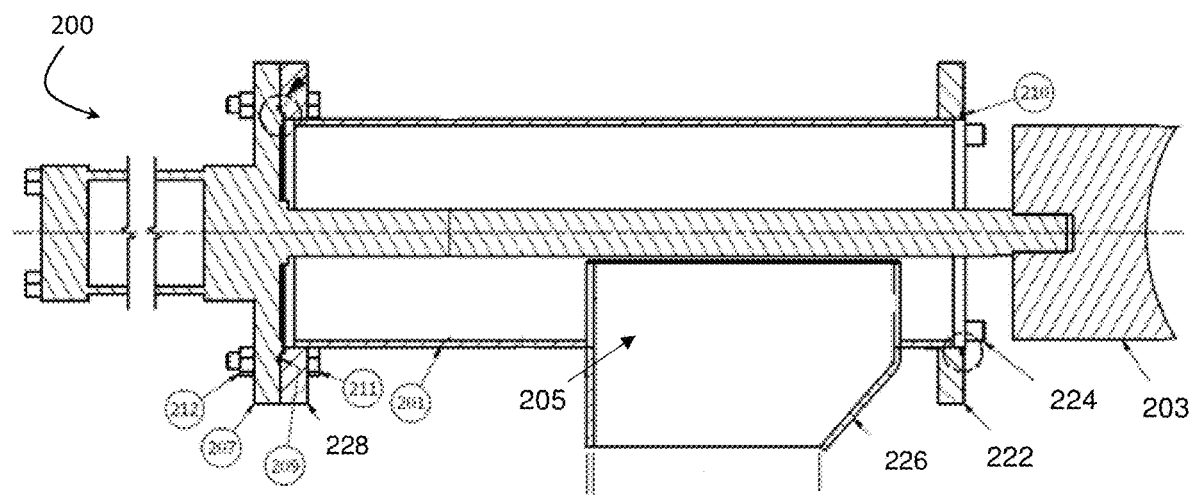
Figure 4C:
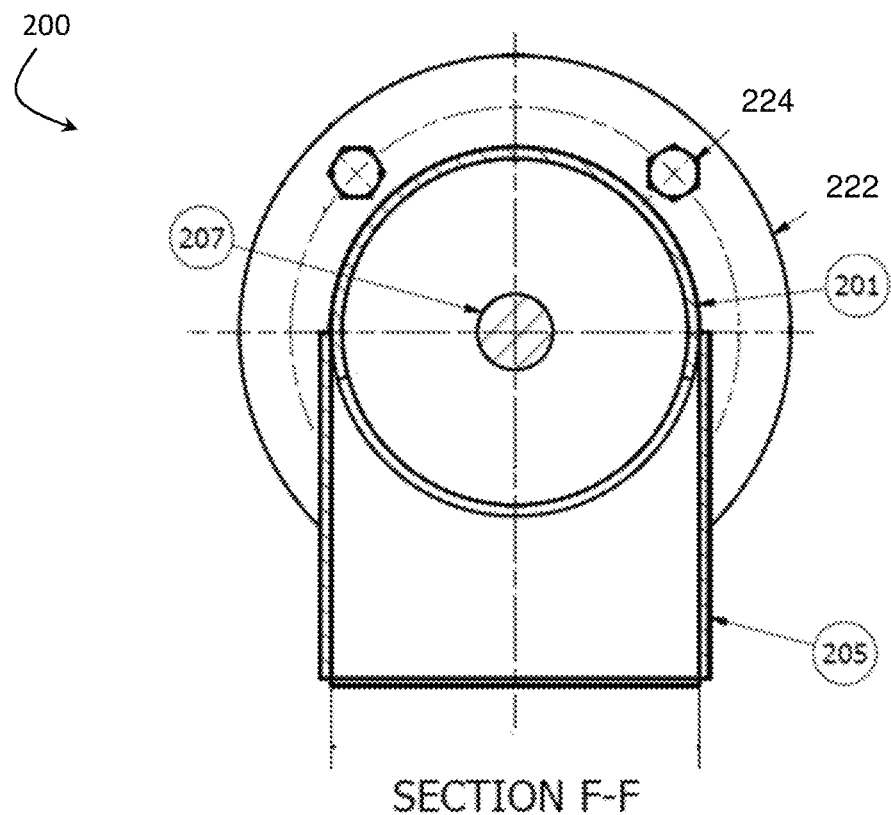

FIG. 4A-4C shows an example of a hydraulic piston assembly 200 (top view) that can be used in FIG. 1A-1D. FIG. 4B shows the cross-sectional view of section E-E of the assembly in FIG. 4A. As shown, hydraulic piston assembly 200 comprises a piston 203, a container 205, a piston housing 201, hydraulic cylinder 207, and various other components associated with the assembly (e.g., flange 222, flange bolt 224, flange gasket 210, cylinder gasket 209, cylinder flange 228, cylinder bolt 211, cylinder nut 212). FIG. 4C shows the cross-sectional view of section F-F of the assembly in FIG. 4A. As shown, the hydraulic piston assembly comprises hydraulic cylinder 207 and container 205 for disposing compressed raw materials, e.g., dewatered and spent coffee grounds.

The hydraulic piston can be used together with the motorized rotary disc valve in the extraction of ingredient grade extract. The operating procedure of assembly 300 is shown in FIG. 5A-5C in detail. As shown, assembly 300 comprises piston 203, hydraulic cylinder 207, as well as a rotary disc valve 135 with a rotatable valve disc 105 having a displaceable fluidic pathway segment 125 (e.g., a bore). The piston can be operated in three different positions—a rest position (FIG. 5A), a compressed position (FIG. 5B), and a retracted position (FIG. 5C). As shown in FIG. 5A, the piston has a curved interface with same degree of curvature as the rotary disc valve such that the curved piston interface is adjacent the rotary disc valve at a rest position.

FIG. 5B shows the hydraulic piston extending into the displaceable fluidic pathway segment (e.g., bore). When the rotary disc valve rotates 90 degrees counterclockwise, hydraulic piston 203 can be extended into the opening of bore 125 of rotary disc valve 135, resulting in a compressed position. In a compressed position, the piston can be used to compress liquid extract out of the wetted raw material (e.g., wet coffee grounds) housed in the rotary disc valve. It should be understood that, in accordance with certain embodiments, only when the piston aligns concentrically with the bore of the rotary disc valve such that a proper seal of the bore can be achieved as the piston enters into the rotary disc valve. FIG. 5C shows the hydraulic piston in a retracted position where the piston 203 retracts behind the container 205. As described elsewhere herein, after the extraction of the second liquid extract, the piston valve can fully retract to a third position, wherein the piston retracts behind the container 205. Accordingly, as described elsewhere herein, raw materials, e.g., dried spent coffee grounds, can be removed from the rotary disc valve and discharged into the container 205 when the piston is in a retracted position.

To produce an ingredient grade extract as shown in FIG. 1B using extractor 100, piston 203 can now advance to mechanically compress the ingredient grade extract out of the rotary disc valve body, with the help of the vacuum pump, and leaving behind dewatered grounds in the rotary disc valve's bore. In this example, the piston is an 8-inch diameter ultra-high molecular weight polyethylene (UHMW) disc whose face is relieved with the same 22-inch curve of the 22-inch outer diameter (OD) valve disc, as shown in FIG. 4B. The size of the piston can be selected based on the amount of material to be dewatered and the extent of dewatering. In this example, a 15-ton hydraulic piston capable of applying well over 500 psi of pressure is used. The ingredient grade extract flows out port 208 with simultaneous vacuum assist to the sealed ingredient grade swirl tank 185 via an in line chiller.

Additional ingredient grade extract has now been vacuumed out into the ingredient grade swirl tank aided by the mechanical pressure, which pushes the extract out the ½ inch port 208 through the chiller into the ingredient grade swirl tank 185. It should be noted that there is a ½ inch 2-way motorized sanitary ball valve at the ½ inch port 208 that has a vacuum supply on one side and a pressurized nitrogen supply on the other. In this case, the ½ inch 2-way motorized sanitary ball valve is configured such that the vacuum can be applied to aid extraction of the ingredient grade extract to the ingredient grade swirl tank.

As the hydraulic piston reaches stall conditions, a vent valve (not shown) opens in at the top of the piston to supply a short burst of nitrogen gas to augment the vacuum, and removes otherwise captured beverage grade extract from the compressed chamber. The 2-way motorized ½ inch sanitary ball valve is actuated to cease the vacuum suction of ingredient grade extract. Instead, a separate 2-way 2-inch motorized sanitary ball valve is now configured to allow a pressurized flow of nitrogen to below the slug of the dewatered coffee grounds into the rotary disc valve's 8-inch bore.

As shown in FIG. 1C, the second full 8-inch drilled and tapped ANSI style flanged port 206 can be used to facilitate discharge of dewatered and spent coffee grounds. It has flange mounts for a hydraulic piston assembly. The horizontal structural tubular 8-inch piston mount 230 with discharge container 205 for spent, dewatered coffee grounds should generally have enough strength to support and align the piston being used. The piston generally has enough hydraulic pressure to remove the desired amount of water, via compression, from the spent coffee grounds in the extraction column base before the spent, dewatered coffee grounds are discharged as a dewatered cake and/or loose grinds. The compression-based dewatering action of the piston is augmented by the suction provided by the ingredient grade pump and tank 185.

Once ingredient grade flow ceases, the piston retracts out of the displaceable fluidic pathway segment (e.g., bore). As shown in FIG. 1C, after retraction, piston 203 travels to fully retracted as far away from the left end of the rotary disc valve 135. At this moment, the 2-way motorized sanitary ball valve at the 2-inch port 208 allows a lightly pressurized flow of inert gas, e.g., nitrogen, to dislodge and expel the spent and dewatered coffee grounds 165 from the rotary disc valve's bore 125, horizontally to the direction of port 206, and into spent coffee grounds container 205 (FIG. 1D). This completes one cycle of extraction, making both beverage grade and ingredient grade extracts and a discharge of dewatered, dry and spent coffee grounds.

After the ingredient grade extract has been produced, the rotary disc valve is then rotated clockwise 90 degrees, back to the position illustrated in FIG. 1A, to accept another batch of wet grounds from the extraction column. The wet grounds may be transported into the bore of the rotary disc valve via gravity and a vacuum pulled from the beverage swirl tank 180. An 8-inch diameter×19.5-inch deep slug of fresh wetted grounds from the extraction column 108 is now pulled into the displaceable fluidic pathway segment (e.g., bore) for a second round of beverage grade extraction, as shown in FIG. 1A.

The cycle time per complete 90 degree rotatable valve disc rotation, including filling, beverage grade coffee extraction, rotation, ingredient grade coffee extraction, and cake and/or grinds discharge is less than 1 minute, yielding more than 60 cycles per hour and more than 1440 cycles per day. Each cycle allows the processing of at least 15.2 pounds of roasted and ground (R&G) coffee grounds every minute (the amount processed is dependent on roast level, gravity compression, vacuum compression, and grind size), which is equivalent to about at least 917 pounds per hour, and about at least 22,008 pounds per day. This results in about 121 oz of beverage grade extract (at 23 brix) per minute and 162 oz of ingredient grade extract (at 30 to 40 brix) per minute. This yields about at least 175,103 oz of beverage grade extract per day.

Example 2

This example illustrates the method of fabricating a rotary disc valve used in an extraction column, in accordance with some embodiments. An example of the fabricated rotary disc valve is shown in FIG. 2 and FIGS. 3A-3C.

Step 1. To make the body of the rotary disc valve (e.g., rotary disc valve body 101 in FIG. 2), a block of 304 or 316 stainless steel 25-inch×25-inch×11-inch thick can be used. Water jet can be used to cut a 21.5-inch diameter×11-inch deep on center (OC) through hole in valve body 101. The center 21.5-inch water jet through hole is further processed into a 22.0-inch inner diameter (ID) hole.

Step 2. To make the rotatable valve disc (e.g., valve disc 105 in FIG. 2), first take a 24-inch stainless steel bar stock×15-inch long and cut it to make a valve disc with a precise 22.0-inch outer diameter (OD). To bore a displaceable fluidic pathway segment in the valve body (e.g., internal bore 125), first turn the valve disc on edge and bore a 22-inch deep and smooth bore hole through it. The bore hole has a 8-inch inner diameter (ID) starting at the top of bore all the way through and the remaining 2.5 inches bore below the screen is counter bored to 9.5 inches in ID. The base of the bore is now shouldered to 9.5 inches to accept the 9.5-inch wedge wire screen, and support disc with perforations, retained by a spring clip. Now two suitable 6-inch diameter bearing shoulders are machined externally on center faces of the valve disc for tapered roller bearing pivots. All surfaces are precision machined, then hard chromed. The machined bearing shoulders can be used to fit bearings (e.g., roller bearing 112 in FIG. 2) to eventually allow the rotatable valve disc to rotate inside the rotary disc valve body.

Step 3. The rotary disc valve body from Step 1 will have 4 ports (e.g., port 202, 204, 206, 208 in FIG. 3B) machined, each to a center of its four 14-inch thick edges, as follows:

First, an 8-inch ID port is made (port 206 in FIG. 3B). The port has an ANSI 8 bolt flange pattern drilled and tapped for mount bolts. The port can be connected to a flange for mounting the piston (e.g., piston 203 in FIG. 4B). Second, an 8-inch ID port (port 202 in FIG. 3B) can be made. Port 202 has an ANSI 8 bolt pattern drilled and tapped into a flange pattern, similar to port 206. Port 202 can be connected to a flange for the 8-inch×120-inch extraction column (e.g., extraction column 108 in FIG. 1A). The third port (e.g., port 208 in FIG. 3B) is a 2-inch port with a 2-inch×1-inch proud sanitary connector. The fourth port (e.g., port 204 in FIG. 3B) is a 2-inch port with a 2-inch×1-inch proud sanitary connector. A third ½ inch port is bored pointing down to release the ingredient extract flow to chiller and swirl tank with vacuum.

Step 4. The rotary disc valve body from Step 1 has a precision 22-inch ID×12-inch depth bored through the center of the block. Two removable 1-inch thick 25-inch×25-inch stainless steel plates with two bearing shoulders are machined in its flanks to support the OD of the 6-inch tapered roller bearing on each side of the valve disc. The 22-inch OD valve disc from Step 2 can be fit into the 22-inch ID rotary disc valve body. A 22-inch OD×½ inch O-ring groove is machine cut as a v-groove and the O-ring is fitted into the annular space between the rotating disc and the rotary disc valve.

Step 5. To seal the valve disc within the rotary disc valve body, two 25-inch×25-inch×1.5-inch thick bolt on side plates with 25-inch×25-inch×¼ inch UHMW gaskets are used to encapsulate the valve disc acting as "seals." The UHMW gaskets are location pinned and bolted to seal the sides of the valve body. Two plates have holes bored on center (OC) to allow for a valve actuator drive.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some aspects may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Devices, systems, and methods can utilize at least one controller (when referred to herein as "the controller," or "computer-implemented control system" it should be understood that such description also applies, unless otherwise indicated to at least one or each of a number of separate controllers/computer-implemented control systems for embodiments utilizing separate controllers/computer-implemented control system or distributed control) configured to control one or more components of the device or system. The devices or systems can comprise one or more sections or zones, and one or more controllers can be configured to independently control each of the one or more sections or zones. At least one section of the one or more sections can comprise one or more subsections, and the same or separate controllers independently or cooperatively can be configured to independently control each of the one or more subsets.

The controller can comprise a user interface comprising a GUI and one or more controls. The controller can be configured to allow a user to enter one or more input parameters via one or more input components. The one or more input components can be touch screens, keyboards, joysticks, electronic mice, audio devices (e.g., audio recorders), remote devices such as a hand-held wired or non-wired device, a phone, and/or a mobile phone. Other input components are possible.

The device can further comprise one or more output components such as, for example, video displays (e.g., liquid crystal displays), alphanumeric displays, audio devices (e.g., speakers), lights (e.g., light emitting diodes), tactile alerts (e.g., assemblies including a vibrating mechanism), or combinations of these.

The controller can be configured to generate one or more output signals configured to be received by one or more external electronic modules. The one or more output signals can comprise, for example, an electric current, an electric signal, a telephonic data stream, a Bluetooth or other wireless signal, or combinations of these. The one or more external electronics modules can comprise, for example, an off-site alarm, a computer processor, a memory, a video system, a software, or combinations of these.

The controller can be configured to allow a user to initiate, modify and/or cease one or more device functions and/or modes.

In some embodiments, the controller(s) and/or computer implemented control system(s) can send and receive reference signals to set and/or control operating parameters of the system. In some embodiments, controller(s) and/or computer implemented control system(s) may be physically integrated into, physically connected to, or hard-wired with other components of the extraction system. In embodiments, controller(s) and/or computer implemented control system(s) can be separate from and/or remotely located with respect to the other system components and may be configured to receive data from one or more remote support devices of the disclosure via indirect and/or portable means, such as via portable electronic data storage devices, such as magnetic disks, or via communication over a computer network, such as the Internet or a local intranet.

The controller(s) and/or computer implemented control system(s) may include several known components and circuitry, including a processing unit (i.e., one or more processors), a memory system, input and output devices and interfaces (e.g., an interconnection mechanism), as well as other components, such as transport circuitry (e.g., one or more busses), a video and audio data input/output (I/O) subsystem, special-purpose hardware, as well as other components and circuitry, as described below in more detail. Further, controller(s) and/or computer implemented control system(s) may be a multi-processor computer system or may include multiple computers connected over a computer network.

The controller(s) and/or computer implemented control system(s) may include one or more processors, for example, a commercially available processor such as one of the series x86, Celeron, Pentium, and Core processors, available from Intel; similar devices from AMD and Cyrix; the 680X0 series microprocessors available from Motorola; and the PowerPC microprocessor from IBM. Many other processors are available, and the controller(s) and/or computer implemented control system(s) is not limited to a particular processor.

A processor typically executes a program called an operating system, of which WindowsNT, Windows95 or 98, Windows XP, Windows Vista, Windows 7, Windows 10, UNIX, Linux, DOS, VMS, and MacOS and are examples, which controls the execution of other computer programs and provides scheduling, debugging, input/output control, accounting, compilation, storage assignment, data management and memory management, communication control and related services. The processor and operating system together define, in accordance with certain embodiments, a computer platform for which application programs in high-level programming languages are written. The controller(s) and/or computer implemented control system(s) is not limited to a particular computer platform.

The controller(s) and/or computer implemented control system(s) may include a memory system, which typically includes a computer readable and writeable non-volatile recording medium, of which a magnetic disk, optical disk, a flash memory and tape are examples. Such a recording medium may be removable, for example, a floppy disk, read/write CD or memory stick, or may be permanent, for example, a hard drive.

Such a recording medium stores signals, typically in binary form (i.e., a form interpreted as a sequence of one and zeros). A disk (e.g., magnetic or optical) has several tracks, on which such signals may be stored, typically in binary form, i.e., a form interpreted as a sequence of ones and zeros. Such signals may define a software program, e.g., an application program, to be executed by the microprocessor, or information to be processed by the application program.

The memory system of controller(s) and/or computer implemented control system(s) also may include an integrated circuit memory element, which typically is a volatile, random access memory such as a dynamic random access memory (DRAM) or static memory (SRAM). Typically, in operation, the processor causes programs and data to be read from the non-volatile recording medium into the integrated circuit memory element, which typically allows for faster access to the program instructions and data by the processor than does the non-volatile recording medium.

The processor generally manipulates the data within the integrated circuit memory element in accordance with the program instructions and then copies the manipulated data to the non-volatile recording medium after processing is completed. A variety of mechanisms are known for managing data movement between the non-volatile recording medium and the integrated circuit memory element, and the controller(s) and/or computer implemented control system(s) that implements the methods, steps, systems control and system elements control described above is not limited thereto. The controller(s) and/or computer implemented control system(s) is not limited to a particular memory system.

At least part of such a memory system described above may store one or more data structures (e.g., look-up tables) or equations such as calibration curve equations. For example, at least part of the non-volatile recording medium may store at least part of a database that includes one or more of such data structures. Such a database may be any of a variety of types of databases, for example, a file system including one or more flat-file data structures where data is organized into data units separated by delimiters, a relational database where data is organized into data units stored in tables, an object-oriented database where data is organized into data units stored as objects, another type of database, or any combination thereof.

The controller(s) and/or computer implemented control system(s) may include a video and audio data I/O subsystem. An audio portion of the subsystem may include an analog-to-digital (A/D) converter, which receives analog audio information and converts it to digital information. The digital information may be compressed using known compression systems for storage on the hard disk to use at another time. A typical video portion of the I/O subsystem may include a video image compressor/decompressor of which many are known in the art. Such compressor/decompressors convert analog video information into compressed digital information, and vice-versa. The compressed digital information may be stored on hard disk for use at a later time.

The controller(s) and/or computer implemented control system(s) may include one or more output devices. Example output devices include a cathode ray tube (CRT) display, liquid crystal displays (LCD), light-emitting diode (LED) displays, and other video output devices, printers, communication devices such as a modem or network interface, storage devices such as disk or tape, and audio output devices such as a speaker.

The controller(s) and/or computer implemented control system(s) also may include one or more input devices. Example input devices include a keyboard, keypad, track ball, mouse, pen and tablet, communication devices such as described above, and data input devices such as audio and video capture devices and sensors. The controller(s) and/or computer implemented control system(s) is not limited to the particular input or output devices described.

It should be appreciated that one or more of any type of controller(s) and/or computer implemented control system(s) may be used to implement various embodiments described. Functions of the controller(s) and/or computer implemented control system(s) may be implemented in software, hardware or firmware, or any combination thereof. The controller(s) and/or computer implemented control system(s) may include specially programmed, special purpose hardware, for example, an application-specific integrated circuit (ASIC). Such special-purpose hardware may be configured to implement one or more methods, steps, simulations, algorithms, systems control, and system elements control described above as part of the controller(s) and/or computer implemented control system(s) described above or as an independent component.

The methods, steps, simulations, algorithms, systems control, and system elements control may be implemented using any of a variety of suitable programming languages, including procedural programming languages, object-oriented programming languages, other languages and combinations thereof, which may be executed by such a computer system. Such methods, steps, simulations, algorithms, systems control, and system elements control can be implemented as separate modules of a computer program, or can be implemented individually as separate computer programs. Such modules and programs can be executed on separate computers.

Such methods, steps, simulations, algorithms, systems control, and system elements control, either individually or in combination, may be implemented as a computer program product tangibly embodied as computer-readable signals on a computer-readable medium, for example, a non-volatile recording medium, an integrated circuit memory element, or a combination thereof. For each such method, step, simulation, algorithm, system control, or system element control, such a computer program product may comprise computer-readable signals tangibly embodied on the computer-readable medium that define instructions, for example, as part of one or more programs, that, as a result of being executed by a computer, instruct the computer to perform the method, step, simulation, algorithm, system control, or system element control.

The controller(s) and/or computer implemented control system(s) and components thereof may be programmable using any of a variety of one or more suitable computer programming languages. Such languages may include procedural programming languages, for example, LabView, C, Pascal, Fortran and BASIC, object-oriented languages, for example, C++, Java and Eiffel and other languages, such as a scripting language or even assembly language.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method of producing a plurality of liquid extracts from a solid raw material, comprising:
    establishing a flow of a solvent through a bed of the solid raw material within an extraction pathway to produce a first liquid extract;
    displacing a segment of the extraction pathway containing at least a portion of the raw material such that the segment becomes fluidically isolated from an upstream segment of the extraction pathway and a downstream segment of the extraction pathway; and
    extending a solid body into the displaced segment such that the solid body compresses the portion of the raw material present within the displaced segment to produce a second liquid extract from the portion of raw material present within the displaced segment.

2. The method of claim 1, wherein the solid raw material comprises coffee beans.

3. The method of claim 2, wherein the solid raw material comprises ground coffee beans.

4. The method of claim 3, wherein the first liquid extract is a beverage grade coffee extract.

5. The method of claim 4, wherein the second liquid extract is an ingredient grade coffee extract.

6. The method of claim 2, wherein the solvent is an aqueous solvent.

* * * * *